(12) United States Patent
Sindhwani

(10) Patent No.: US 10,720,159 B1
(45) Date of Patent: *Jul. 21, 2020

(54) EMBEDDED INSTRUCTIONS FOR VOICE USER INTERFACE

(71) Applicant: Amazon Technologies, Inc., Seattle, WA (US)

(72) Inventor: Manoj Sindhwani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,428

(22) Filed: Oct. 12, 2018

Related U.S. Application Data

(63) Continuation of application No. 15/473,818, filed on Mar. 30, 2017, now Pat. No. 10,102,855.

(51) Int. Cl.
*G10L 15/00* (2013.01)
*G10L 15/22* (2006.01)
*G06F 3/16* (2006.01)
*G06Q 30/06* (2012.01)
*G06Q 10/08* (2012.01)
*G06F 40/134* (2020.01)
*G06F 40/169* (2020.01)
*G06F 40/279* (2020.01)
*G06F 16/951* (2019.01)

(52) U.S. Cl.
CPC .............. *G10L 15/22* (2013.01); *G06F 3/167* (2013.01); *G06F 40/134* (2020.01); *G06F 40/169* (2020.01); *G06F 40/279* (2020.01); *G06Q 10/087* (2013.01); *G06Q 30/0635* (2013.01); *G06F 16/951* (2019.01); *G10L 2015/223* (2013.01)

(58) Field of Classification Search
CPC .................................. G10L 15/30; G06F 3/167
USPC ......................................................... 704/275
See application file for complete search history.

(56) References Cited

U.S. PATENT DOCUMENTS 9,213,659 B2 * 12/2015 Beaumont ............... G06F 13/36
2019/0057703 A1 * 2/2019 Zeinstra .................. G10L 15/30

* cited by examiner

*Primary Examiner* — Daniel Abebe
(74) *Attorney, Agent, or Firm* — Pierce Atwood LLP

(57) ABSTRACT

Methods and systems for rendering lists of instructions and performing actions associated with those lists are described herein. In some embodiments, an individual may request that a voice activated electronic device associated with their user account assist in performing a task using a list of instructions. The list of instructions may include metadata that indicates actions capable of being performed by additional Internet of Things ("IoT") devices. When the instructions are rendered, an instructions speechlet may recognize the metadata and may cause one or more of the IoT devices to perform a particular action. Furthermore, the metadata may also correspond to content capable of being rendered by the voice activated electronic device to assist the individual in performing a particular step of the instructions.

20 Claims, 9 Drawing Sheets

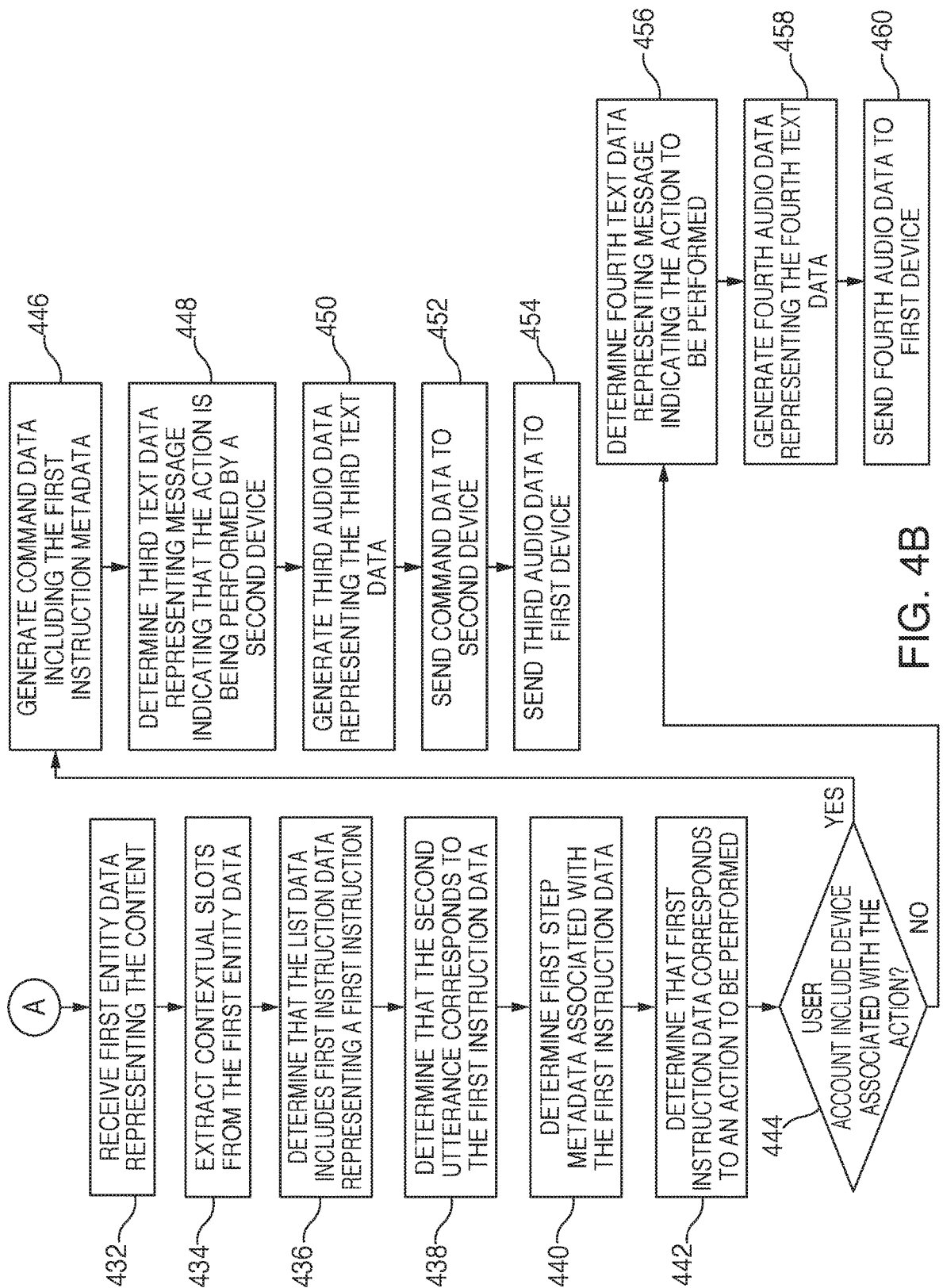

US 10,720,159 B1

EMBEDDED INSTRUCTIONS FOR VOICE USER INTERFACE

This application is a continuation of, and claims priority to, U.S. patent application Ser. No. 15/473,818, entitled "EMBEDDED INSTRUCTIONS FOR VOICE USER INTERFACE," filed on Mar. 30, 2017, in the name of Minoj Sindhwani, and scheduled to issue as U.S. Pat. No. 10,102,855, on Oct. 16, 2018. The above application is hereby incorporated by reference in its entirety.

BACKGROUND

Electronic devices, such as voice activated electronic devices, are capable of performing various functions. Some voice activated electronic device may also include displays capable of outputting content and/or communicating with one or more additional devices/systems.

BRIEF DESCRIPTION OF THE DRAWINGS

FIGS. 4A and 4B are illustrative flowcharts of an exemplary process for determining an action to be performed by a first device based on list data and audio data output by a second device, in accordance with various embodiments;

DETAILED DESCRIPTION

Figure 1:
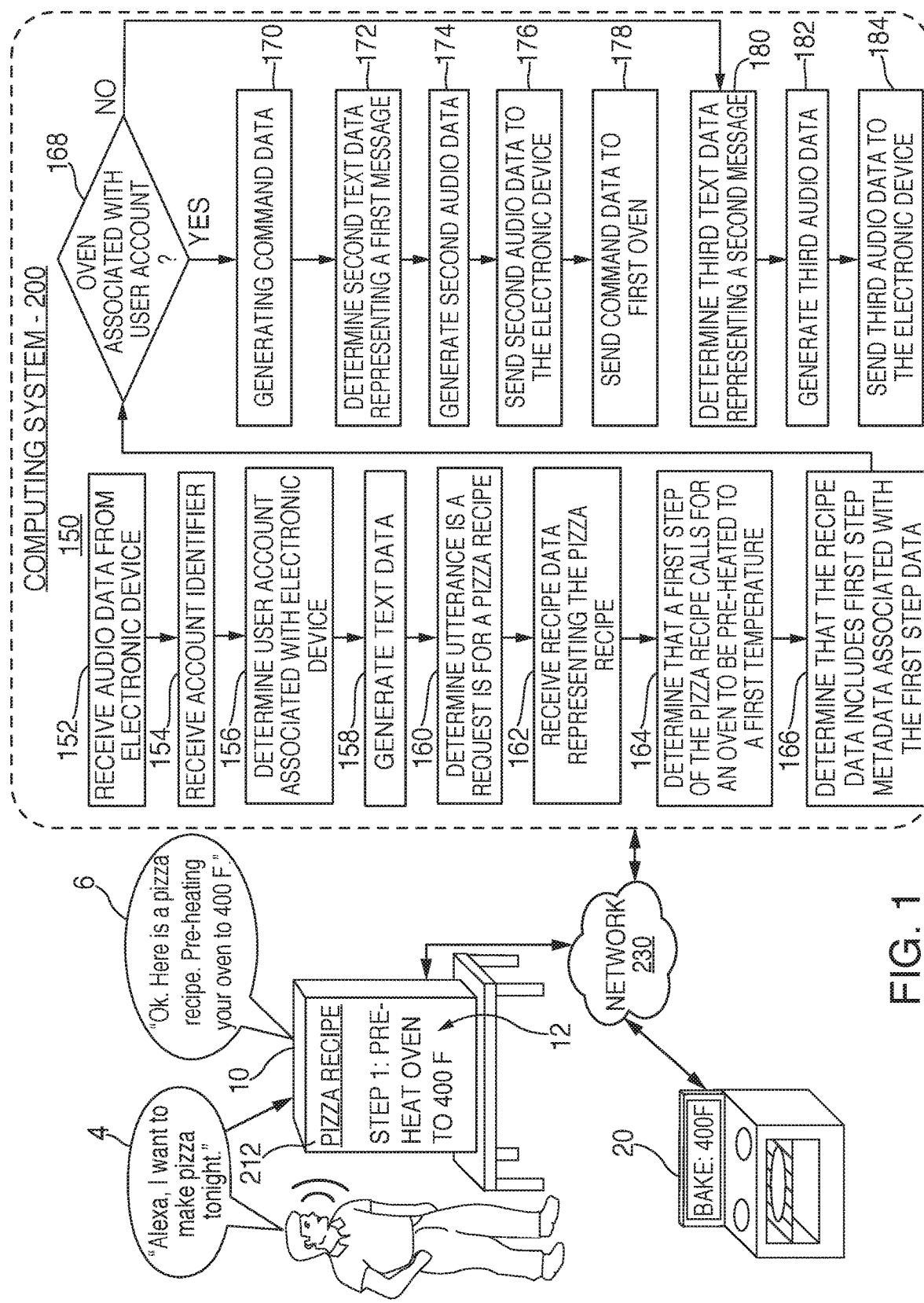
FIG. 1 is an illustrative diagram of an exemplary system for causing an action to be performed by a first device based recipe data provided to a second device, in accordance with various embodiments.

The present disclosure, as set forth below, is generally directed to various embodiments of methods and systems generating interactive instructions, and using such interactive instructions to assist in completing a task. For example, recipe data may be generated by a recipe builder, and individuals may render the recipe data using their electronic devices to prepare a food item. In some embodiments, a device may render content including a list of instructions. List data representing the list may include instructions data representing an instruction, which may also be referred to herein as a step of the list, to be carried out in order to complete a task (e.g., preparing a food item). For instance, a recipe may include multiple steps to be performed to cook a food item. Additionally, the instructions data may include text data that is intended for presentation to a human, via audibly and/or visually, and that describes an action for the human to do to that is associated with the task. Furthermore, in some embodiment, the instruction data may include metadata. The metadata may be associated with a particular instruction, and may indicate an action to be performed for that step, types of devices needed for the action, and/or supplemental information associated with performing that action. As another example, the instructions data may include metadata that indicates one or more items that may be needed for completing the task.

As described herein, a list of instruction may corresponding to one or more instructions to be performed/carried out in order to complete a task. A recipe may correspond to one type of list of instruction, for instance, that is associated with preparing a food item. For example, a pizza recipe may correspond to a list of instructions whose task relates to cooking a pizza. The recipe may include steps, which may correspond to instructions, to be performed/carried out in order to complete the task associated with the recipe (e.g., preparing and/or cooking the food item).

In a non-limiting embodiment, an individual may speak an utterance indicating that he/she would like to perform a task. For example, an individual may say, "I want to make pizza," or "I want to build a bird house." An electronic device located within a same environment as the individual may be capable detecting the utterance, and may send audio data representing the utterance to a computing system to assist in performing some or all of the task. The computing system, which may include a speech-processing system, may generate text data representing the audio data, and may determine an intent of the utterance using natural language understanding processing.

As an illustrative example, the intent of the utterance, "I want to make pizza," may be for recipe data representing a pizza to be provided to the electronic device such that the individual may follow the recipe to make the item (e.g., a pizza). After identifying an appropriate recipe, the computing system may provide the electronic device with display data representing content (e.g., a graphical user interface ("GUI")) including some or all of the instructions. For example, the recipe data may include first step data representing a first step indicating that an oven should be pre-heated to a first temperature. In some embodiments, the first step data may include text data that is intended for presentation to a human (e.g., the individual) and that describes a first action (e.g., to pre-heat an oven to a first temperature) for the human to do for the recipe. The computing system may determine whether there are any additional devices associated with a same user account as the electronic device capable of performing the desired function (e.g., heat an oven). If so, then command data representing an instruction to cause the oven to perform the action (e.g., heat to the first temperature) may be generated and sent to the identified additional device (e.g., an oven). Further still, the computing system may generate and send audio data representing a message indicating to the individual that the first step is being performed. However, if the computing system determines that there are no additional electronic devices associated with the user account that are capable of performing the first action, then the computing system may determine text data representing a message indicating that the action that the human is to person (e.g., the individual pre-heating their oven to the desired temperature), and may generate and send audio data representing the text data to the electronic device.

In some embodiments, instruction metadata associated with instruction data of the list of instructions may be used to identify supplemental content to provide to an electronic device for that particular step. For instance, while trying to perform a particular instruction, an individual may inquire as to how that instruction is performed. For example, if one step of the pizza recipe is to "knead the dough," the individual may ask, "How do I knead dough?" Metadata associated with that step's step data may be pre-populated to include supplemental information, such as, but not limited to, one or more contextual links, video links, and/or audio links, that are capable of being provided to the individual to help/assist (e.g., visually and/or audibly) with performing/carrying out that step. Continuing the example above, in response to receiving audio data representing the utterance "How do I knead dough?", the computing system may generate text data representing the utterance. The recipe data may include metadata associated with the "knead dough" step that may indicate expected utterance text data representing one or more utterances (e.g., "expected utterances") that may be expected to be spoken for this step. The computing system may generate a similarity score between the text data and expected utterance text data representing an expected utterance. If the similarity score is greater than predefined threshold value, then this may indicate that the utterance is one of the expected utterances associated with the particular step. In this particular scenario, metadata associated with that step, such as information to assist the individual in performing one or more actions associated with the step, may be provided to the electronic device. As an illustrative example, a URL to a video explaining and showing "how to knead dough" may be sent to the electronic device. If, however, the similarity score is determined to be less than or equal to the predefined threshold value, then the computing system may provide the text data to a natural language understanding system to allow additional speech processing to be performed.

In some embodiments, notification data indicating that the electronic device is currently rendering content (e.g., a GUI including the recipe) thereon may be received by the computing system. Entity data representing the content may be received from a domain responsible for providing the content, and natural language understanding processing may use the entity data and the text data representing an utterance to determine an intent of the utterance. For instance, because the entity data indicates that the step of kneading dough is currently being displayed, the computing system may recognize that there is metadata associated with that step. Therefore, in response to the inquiry, the computing system may use the metadata to provide a video, for example, of how to knead dough to the electronic device.

In still some additional embodiments, instructions data may include metadata indicating items needed to complete the task (e.g., ingredients needed to cook a food item). The computing system may determine a user account that the electronic device that requested the instructions data is associated with, and may determine that an additional device capable of storing, tracking, and/or monitoring items stored thereby (e.g., a smart refrigerator and/or a smart shelving system). The item storage database associated with the user account may include inventory data that indicates item information associated items currently and/or previously stored by the additional device configured to store items (e.g., refrigerator). The computing system may determine that a first item is needed for the task, as indicated by the metadata, and using the inventory data, the computing system may determine that the first item is absent from the additional device. In this particular scenario, the computing system may determine text data representing a message indicating that the first item is unavailable, and may inquire as to if/when the individual would like to purchase the first item. Audio data representing this text data may be generated and sent to the electronic device. If the individual says "yes," as well as potentially indicating a time that he/she wants the first item to be delivered, the computing system may generate purchase data representing a purchase request for the first item to be bought and delivered for the requested time, and may send the purchase request to an purchase fulfillment system/service.

In some embodiments, an electronic device, such as those described previously, may be a sound controlled electronic device. A sound controlled electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device is one type of sound controlled electronic device. In response to determining that a wakeword has been uttered, the voice activated electronic device may, in some embodiments, send the audio data representing a spoken utterance subsequently following the wakeword to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or may cause one or more additional electronic devices to output content and/or perform a particular action (e.g., turn on a light, preheat an oven, etc.). Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music," or "Alexa—Buy that." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the electronic device may additionally, or alternatively, correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1 is an illustrative diagram of an exemplary system for causing an action to be performed by a first device based recipe data provided to a second device, in accordance with various embodiments. In the non-limiting example embodiment, an individual 2 may speak an utterance 4 to a voice activated electronic device 10. For example, individual 2 may say, "Alexa, I want to make pizza tonight." In response to determining that a wakeword (e.g., "Alexa") for electronic device 10 was uttered, electronic device 10 may begin packing and sending audio data representing utterance 4 to a computing system 200 via a network 230. Computing system 200, may perform speech processing to the audio data to cause one or more actions to occur such as, and without limitation, provide a response to utterance 4, cause one or more devices/systems to perform an action, and/or communicate with one or more additional devices/systems.

Computing system 200 may, in some embodiments, perform exemplary process 150, which may begin at step 152. At step 152, first audio data representing utterance 4 may be received from electronic device 10. As mentioned previously, the first audio data may be sent to computing system 200 in response to electronic device 10 determining that a wakeword (e.g., "Alexa," "Computer," etc.) had been uttered within an environment where electronic device 10 is located. However, in some embodiments, the first audio data may be sent to computing system 200 in response to any suitable trigger expression. For example, the trigger expression may be two or more words, such as a phrase, (e.g., "Hello, Alexa," "Good Morning," etc.), a sound trigger (e.g., the sound of breaking glass, clapping, etc.), and/or a manual input detected by electronic device 10. Furthermore, in some embodiments, individual 2 may input text data directly to electronic device 10, which may be sent to computing system 200, or an additional device/system may send text data associated with an input (either audibly spoken, or manually input) originating from electronic device 10 to computing system 200.

At step 154, an account identifier associated with electronic device 10 may be received by computing system 200. In some embodiments, the account identifier may be sent by electronic device 10 to computing system 200 at a substantially same time as the first audio data. The account identifier may, for example, be sent as metadata appended to the first audio data, however persons of ordinary skill in the art will recognize that this is merely exemplary. The account identifier, as described herein, may indicate a particular user account on computing system 200 that electronic device 10 is registered to. For example, when initially setting up electronic device 10, an individual may indicate to computing system 200 that electronic device 10 is to be associated with that individual's account on computing system 200. That account, which may be set up prior to individual 2 "setting up" electronic device 10, may include and store such information as payment information (e.g., credit card numbers, payment plans), shipping information (e.g., a mailing address), user history (e.g., purchase history, interaction history, etc.), and/or user preferences. Persons of ordinary skill in the art will recognize that, in some embodiments, a device identifier (e.g., a media access control ("MAC") address, IP address, and/or serial number) associated with electronic device 10 may alternatively and/or additionally be sent to computing system 200 from electronic device 10, and the device identifier may be used to determine the account identifier.

At step 156, a user account associated with the electronic device may be determined. For instance, a user account on computing system 200 associated with the account identifier received from electronic device 10 may be determined. In some embodiments, the user account may indicate which devices/systems are accessible/available for a user associated with the user account. The user account may be determined to be associated with a first device, voice activated electronic device 10, as well as being associated with a second device, Internet of Things ("IoT") device 20. For example, IoT device 20 may correspond to a "smart" oven, a "smart" refrigerator, a "smart shelving" system, or any other suitable type of device, or any combination thereof. Persons of ordinary skill in the art will recognize that the term "smart" as described above may indicate that a particular device including that device's normal functionality and also may be capable of being interacted with via network 230. The user account may further store information regarding device identifiers, IP addresses, communications information, and the like, that may be associated with that particular user account. Further still, the user account may store information personal to one or more users associated with the user account such as, but not limited to, credit card information, telephone numbers, email addresses, mailing addresses, and/or contact lists.

At step 158, first text data representing the first audio data may be generated. For instance, upon receipt by computing system 200, the first audio data may be provided to a speech-processing system associated with computing system 200 (as described in greater detail below with reference to FIG. 2B). In one embodiment, an orchestrator component of the speech-processing system may receive the first audio data initially, and may provide the first audio data to an automatic speech recognition ("ASR") system to perform ASR processing. The ASR processing may attempt to match the spoken audio to text using one or more grammar models and language models, such that first text data that represents the first audio data may be generated.

At step 160, an intent of the utterance may be determined, where the intent may correspond to a request for a pizza recipe to be provided to electronic device 10. In some embodiments, upon the first text data being generated, the orchestrator may provide the first text data to a natural language understanding ("NLU") system to perform NLU processing to the first text data. The NLU processing may attempt to determine an intent of the utterance based on the first text data and various language models. For instance, NLU processing may determine that an intent of utterance 4 is for a pizza recipe to be provided to electronic device 10 such that individual 2 may prepare a pizza using an interactive recipe.

At step 162, recipe data representing a pizza recipe may be received from an instructions database. For instance, a recipe database may correspond to one type of instructions database that may be populated by recipe data associated with various recipes, or more generally lists of instructions, that are capable of being followed such that an individual may perform a specified task or tasks (e.g., preparing a food item, building an object, and the like). Each list of instructions represented by list data representing a list of instructions, which may include instruction data representing one or more instructions to be performed/carried out to complete a particular task. As an illustrative example, each recipe stored by the recipe database may be represented by recipe data, and may include one or more steps to cook a food item. Some list data (e.g., recipe data) may include instruction metadata associated with instruction data (e.g., step data representing a step of the recipe), which may be capable of being used to assist an individual in performing an action associated with that instruction. For example, step metadata associated with step data corresponding to a particular step of a recipe may indicate a URL to a video illustrating how to perform that step. As still yet another example, step metadata associated with a particular step may indicate an action to be performed by another device to complete that step. In one embodiment, recipe data representing a particular recipe may be formatted as an XML file, however persons of ordinary skill in the art will recognize that this is merely exemplary.

In some embodiments, list data may include item metadata associated with instruction data representing a particular instruction of the list of instructions that indicates one or more items needed to complete the intended task of that list. For example, recipe data may include item metadata indicating one or more items (e.g., ingredients) needed to cook the desired food item associated with that recipe data's recipe (e.g., flour, oil, chicken, etc.).

In the illustrative embodiment, utterance 4 may correspond to a request for a pizza recipe, however persons of ordinary skill in the art will recognize that this is merely exemplary. For example, an individual may request that an action be performed (e.g., turn on a light), and/or request information (e.g., weather information, traffic information, etc.). In the illustrative example, individual 2 may seek to obtain a recipe for making a pizza. Computing system 200 may, beforehand, store a previously used pizza recipe used by individual 2 with the user account, or if no recipe had been previously used, computing system 200 may select a most frequently used recipe by other individuals. Therefore, upon identifying a recipe that corresponds to the intent of utterance 4, computing system 200 may provide recipe data representing the recipe to one or more processors associated with computing system 200 and/or one or more additional devices/systems.

In some embodiments, a recipe domain associated with computing system 200 may, upon receiving the recipe data, may determine display data representing a GUI including the recipe to be generated and sent to electronic device 10. For example, display data representing a GUI 12 may be generated, and the display data may be sent to electronic device 10. Electronic device 10 may then be configured to cause GUI 12 to be rendered by display screen 212 such that some or all of the recipe is viewable by individual 2 (or any other additional individuals) via display screen 212. For example, GUI 12 may include a text description of a first step of the pizza recipe (e.g., Step 1: Pre-heat oven to 400 F).

At step 164, computing system 200 may determine that a first step of the pizza recipe calls for an oven to be pre-heated to a first temperature. In some embodiments, the first step data may include text data that is intended for presentation to a human (e.g., individual 2) and describes a first action for the human to do to prepare the first food item. For instance, the recipe data may include first step data representing a first step (e.g., pre-heat the oven to the first temperature) of the pizza recipe. The first step may be determined, in some embodiments, by one or more processors associated with the recipe functionality of computing system 200. For example, an applet and/or speechlet (e.g., an applet associated with speech) may be capable of facilitating actions associated with a particular functionality (e.g., a first party application, a third party application, etc.) of computing system 200. As an illustrative example, a recipe speechlet may be configured to receive the recipe data, and may determine the various steps associated with the recipe using the recipe data. For instance, the recipe speechlet may determine that the recipe data includes first step data representing a first step of the recipe. The recipe speechlet may, therefore, be capable of identifying that a first step of the recipe is for an oven to be pre-heated to a first temperature. The specific temperature may be indicated by metadata associated with the first step data that is also included with the received recipe data.

At step 166, computing system 200 may determine that the recipe data further includes first step metadata associated with the first step data. In one embodiment, the first step metadata may indicate a first temperature that an oven is to be pre-heated to. For example, the recipe speechlet may determine that the first step metadata is associated with the first step data. The first step metadata may indicate, in one embodiment, an action associated with the first step, a type of device associated with the action, and supplemental information associated with the action. For example, the first step metadata may indicate that an oven is needed for the first step, that the oven is to be pre-heated to a first temperature, and a particular temperature associated with the first temperature (e.g., 400 degrees Fahrenheit).

At step 168, a determination may be made as to whether there is an oven associated with the user account. For instance, based on the first step metadata indicating that the first step is associated with a particular type of device performing a first action, the recipe speechlet may determine whether the user account is associated with any additional devices and, if so, whether those devices are of a same type of device as indicated by the first step metadata.

If, at step 168, it is determined that there is a first oven associated with the user account, command data representing an instruction to cause the first oven to perform the first action. For instance, the command data may represent at least the first step metadata may be generated. For example, the command data may indicate that IoT device 20 is to pre-heat to the first temperature. In one embodiment, the recipe speechlet may be configured to generate the command data based on the information associated with the first step (e.g., the first step data and the first step metadata). The command data may indicate the action to be performed, the device that action is to be performed by, and metadata associated with the action.

At step 172, second text data representing a first message may be determined. For instance, after the command data is sent to IoT device 20, the recipe speechlet may be notified that the first step has been completed. Therefore, the recipe data may include a message to be prompted to individual 2 in response to receiving notification data from IoT device 20 indicating that the first step has been completed. For instance, the first message may indicate that the recipe for making pizza has been found, and that the first step has been performed. At step 174, second audio data representing the second text data may be generated. For example, the second text data may be provided to a text-to-speech ("TTS") system to perform speech synthesis processing, thereby generating audio data. After the second audio data has been generated, at step 176, the second audio data may be sent by computing system 200 to electronic device 10. In the illustrative embodiment, electronic device 10 may, upon receiving the second audio data, output message 6—"Ok. Here is a pizza recipe. Pre-heating your oven to 400 F." At a substantially same time, at step 178, the command data may be sent to the first oven. For example, the command data may be sent by computing system 200 to IoT 20. In some embodiments, the recipe speechlet may be configured to generate and send the command data, however persons of ordinary skill in the art will recognize that this is merely exemplary. Furthermore, the command data may be sent prior to, or after, the audio data is sent to electronic device 10, and the aforementioned is merely exemplary.

If, at step 168, it is determined that there is no oven associated with the user account, or more generally if it determined that there are no devices associated with the user account that are of a same type of device as that indicated by the first step metadata, then process 150 may proceed to step 180. At step 180, third text data representing a second message may be determined. The second message may indicate to individual 2 that he/she needs to perform the action associated with the first step. For instance, the second message may indicate to individual 2 that he/she needs to pre-heat their oven to the first temperature as there are no IoT devices 20 that are of a same type of device as the oven indicated as being needed for the first step. For example, the second message may be, "Please pre-heat your oven to 400 degrees Fahrenheit." At step 182, third audio data may be generated representing the third text data. For instance, the third text data may be provided to a text-to-speech system to generate audio data representing the third text data. In some embodiments, step 174 and step 182 may be substantially similar to each other. At step 184, the third audio data may be sent to electronic device 10.

In some embodiments, computing system 200 may, upon a step being completed, may be instructed to proceed to the next step of the recipe. For example, after the command data has been sent to IoT device 20, and after the second audio data has been sent to electronic device 10, the recipe data may cause the recipe speechlet to move to the next step in the recipe (e.g., step two). Furthermore, the recipe speechlet may be configured to continue to monitor the activities of IoT device 20 such that, when IoT device 20 completes the pre-heating process, notification data may be sent to computing system 200 by IoT device 20 that indicates that IoT device 20 has completed the action. In one embodiment, upon receiving the notification data, computing system 200 may cause the recipe speechlet to generate and send audio data representing an additional message indicating to individual 2 that the pre-heating has completed.

However, if, as described above, the user account does not have a smart oven associated with it, then individual 2 may need to update computing system 200 that the step has been performed. For example, the second message may further indicate that individual 2 is to inform computing system 200 when the action (e.g., pre-heat an oven) has been completed. Therefore, when individual 2 says, "Alexa, I have pre-heated the oven to 400 degrees Fahrenheit," the recipe speechlet may be configured to proceed to a next step of the recipe.

In the illustrative embodiment, IoT device 20, which may correspond to a smart oven, may be caused to begin heating. However, if an additional action is not performed (e.g., putting an item in the oven to cook), the smart oven may continue to heat, and thus become a potential safety issue. Therefore, the recipe data may further include instructions that cause additional command data to be sent to the smart oven in the event that one or more other conditions arise. For example, the command data may further include a time-out feature. When the command data is generated and sent to the first oven, the recipe speechlet may begin a timer that indicates when the first oven should finish its task. For example, a subsequent step of the pizza recipe may call for a pizza to be placed in the first oven and cooked for a particular amount of time. Therefore, using the recipe data, the recipe speechlet may determine an approximate time that the individual performing the tasks to make the pizza should reach that particular step, as well as when that step should be finished. Thus, if the smart oven has otherwise not been turned off prior to the expected end time of the recipe, then the recipe data may include additional command data that causes the smart oven to be shut off.

In some embodiments, computing system 200 may be configured to monitor additional IoT devices associated with the user account to determine whether individual 2 has begun to perform any additional tasks, and therefore is likely no longer located in a same environment as electronic device 10 and IoT device 20. For example, the user account may also be associated with an automobile and/or a garage opening system. If, while the recipe data indicates that the recipe is being performed, computing system 200 receives a notification that the automobile has turned on and/or the garage door opening system has opened a garage door, electronic device 10 may be prompted to determine whether individual 2 is still present. For example, a message "Your car just turned on. Do you still want to cook?", may be output by electronic device 10. If no response to the message is detected within a predefined amount of time, then computing system 200 may cause additional command data to be sent to the first oven that causes the first oven to shut off. In this way, computing system 200 may prevent the smart oven from maintaining an elevated temperature while no one is present.

Figure 2A:
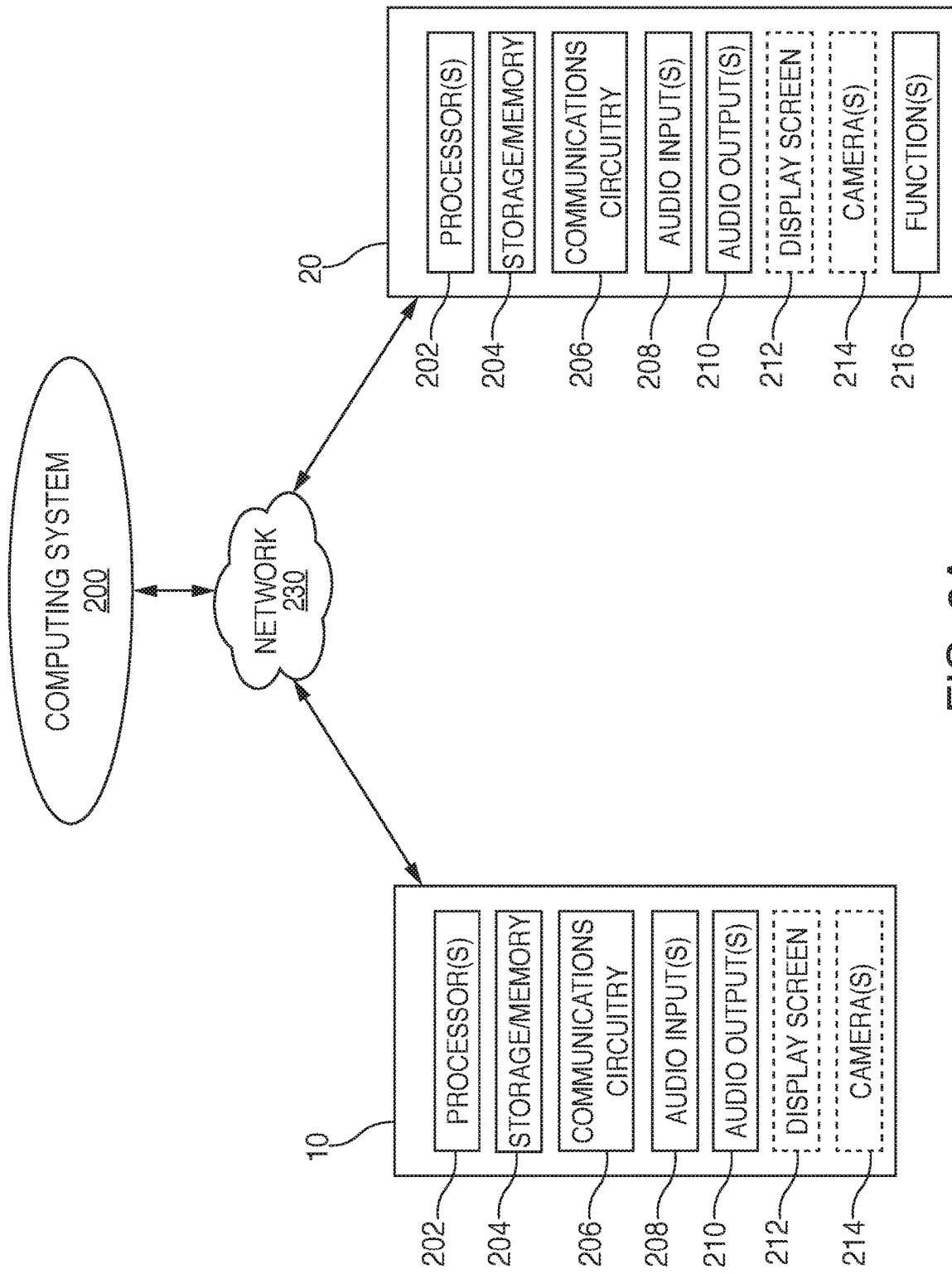
FIGS. 2A and 2B are illustrative diagrams corresponding to the exemplary system architecture of FIG. 1, in accordance with various embodiments.
Figure 2B:
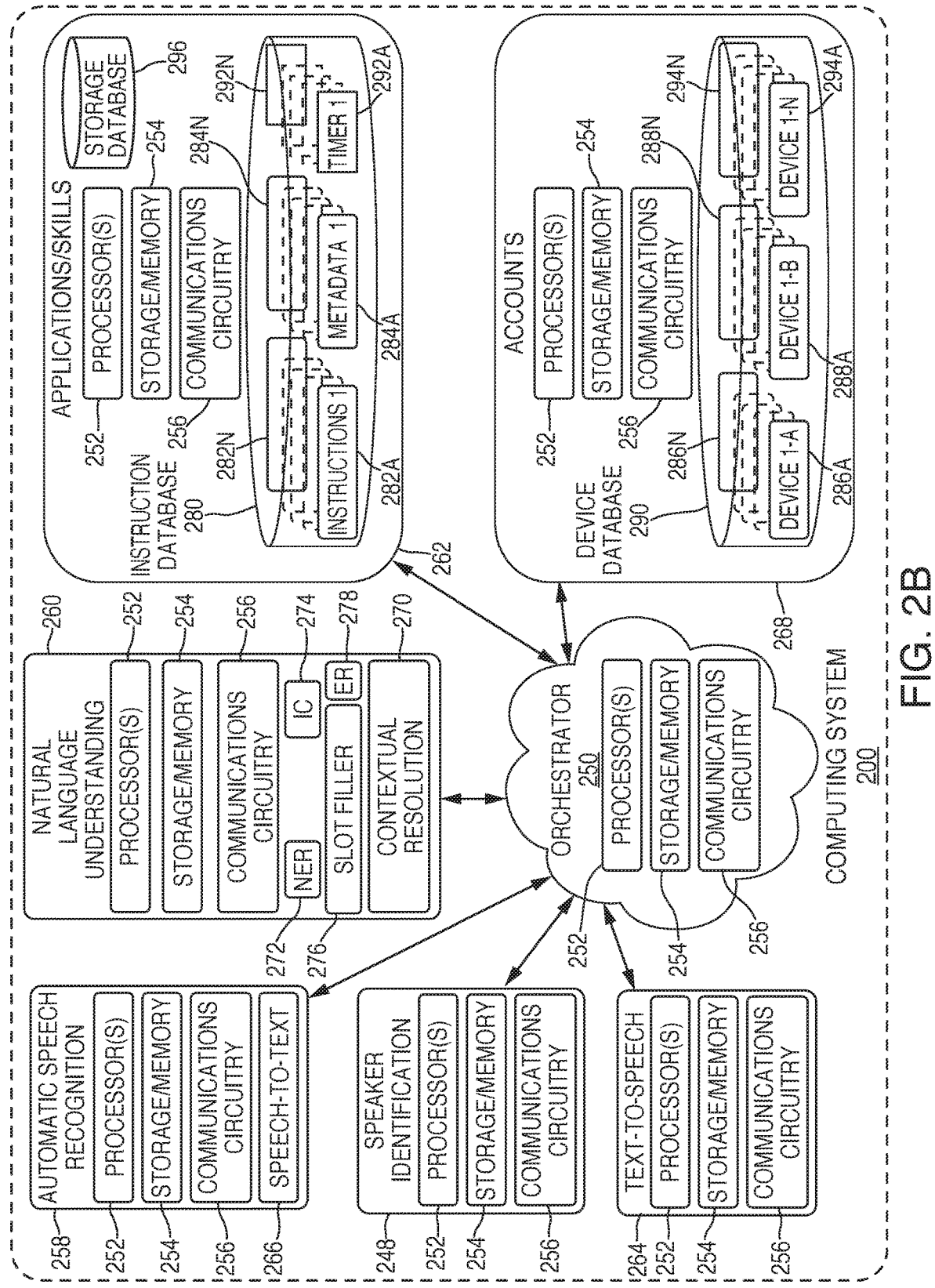

FIGS. 2A and 2B are illustrative diagrams corresponding to the system architecture of FIG. 1, in accordance with various embodiments. FIG. 2A, in one embodiment, illustrates the exemplary system architecture of FIG. 1, and in particular, the various components of electronic device 10 and an Internet of Things ("IoT") device 20. For example, electronic device 10 may correspond to a voice activated electronic device, and IoT device 20 may correspond to a smart oven, as described in greater detail above. In some embodiments, electronic device 10 may include sound controlled functionality, such as one or more voice and/or sound activated components. In some embodiments, electronic device 10 may be configured to communicate with computing system 200 in response to detecting an utterance including a wakeword, which may subsequently be followed by a request/question/statement. Similarly, electronic device 10 may alternatively or additionally include one or more manually activated components for manually activating electronic device 10. In this particular scenario, electronic device 10 may also be configured, in one embodiment, to communicate with computing system 200 in response to a manual input being detected by one or more input mechanisms, such as a touch screen, a button, and/or a switch, for example.

In a non-limiting embodiment, electronic device 10 may be capable of being activated in response to detecting a specific sound, such as a wakeword, as well as, or alternatively, via one or more inputs. After detecting a specific sound (e.g., a wakeword or trigger expression), electronic device 10 may recognize commands (e.g., audible commands, inputs) within captured audio, and may perform one or more actions in response to the received commands. Furthermore, electronic device 10 may also be configured to perform one or more actions in response to detecting a particular touch, or mechanical, input(s) via electronic device 10.

Electronic device 10 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, ovens, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 10 may be relatively simple or basic in structure such that no, or a minimal number of, mechanical input option(s) (e.g., keyboard, mouse, track pad) or touch input(s) (e.g., touch screen, buttons) are included. For example, electronic device 10 may be able to receive and output audio, and may include power, processing capabilities, storage/memory capabilities, and communication capabilities. However, in other embodiments, electronic device 10 may include one or more components for receiving mechanical inputs or touch inputs, such as a touch screen and/or one or more buttons.

Electronic device 10, in one embodiment, may include a minimal number of input mechanisms (e.g., a power on/off switch) such that functionality of electronic device 10 may solely or primarily be through audio input and audio output. For example, electronic device 10 may include, or be in communication with, one or more microphones that listen for a wakeword by continually monitoring local audio. In response to the wakeword being detected, electronic device 10 may establish a connection with computing system 200, send audio data to computing system 200, and await/receive a response from computing system 200. In this way, electronic device 10 may provide a voice user interface ("VUI"), such that interactions with electronic device 10 may primarily occur via voice. In some embodiments, however, non-voice/sound activated devices may also communicate with computing system 200. For example, in response to a button or touch screen being pressed, or a button or touch screen being pressed and held, a microphone associated with electronic device 10 may begin recording local audio, establish a connection with computing system 200, send audio data representing the captured audio to computing system 200, and await/receive a response, and/or action to be occur, from computing system 200.

Persons of ordinary skill in the art will recognize that computing system 200 may be located within a dedicated computing device or computing system, which may or may not be in communication with one or more additional devices. For instance, computing system 200 may be located on a remote computing system with which an individual subscribes to a service on. For example, an individual may have a user account on computing system 200. However, computing system 200 may also be included within a computing system locally stored or owned by an individual.

Electronic device 10 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 10, and/or one or more components may be omitted. For example, electronic device 10 may also include a power supply or a bus connector. As still yet another example, electronic device 10 may include one or more additional input and/or output mechanisms, such as one or more buttons, or one or more switches or knobs. Furthermore, while electronic device 10 may include multiple instances of one or more components, for simplicity only one of each component has been shown.

In some embodiments, electronic device 10 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 10 may be in communication with an additional processing device including one or more of: processor(s) 202, storage/memory 204, communications circuitry 206, audio input(s) 208, audio output(s) 210, display screen 212, and/or camera(s) 214. For example, a centralized control device of electronic device 10 may include one or more audio input(s) 208. These audio input(s) 208 may receive audio input signals, and electronic device may determine whether or not the audio input signals indicate that a wakeword was uttered. If so, then electronic device may cause audio data representing an utterance including the wakeword, or spoken after the wakeword. To be sent to computing system 200.

Processor(s) 202 may include any suitable processing circuitry capable of controlling operations and functionality of electronic device 10, as well as facilitating communications between various components within electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 10, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 10.

Storage/memory 204 may include one or more types of storage mediums such as any volatile or non-volatile memory, or any removable or non-removable memory implemented in any suitable manner to store data for electronic device 10. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and computing system 200. For example, the media system may store one or more communications protocols that may be executed by processor(s) 202 for facilitating communications for device 100. In some embodiments, a sessions initiation protocol ("SIP") may be used to facilitate media transfer between electronic device 10 and one or more of computing system 200 and another electronic device 10. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 10. In some embodiments, a Web Real-Time Communications ("WebRTC") protocols may be employed by electronic device 10. In a non-limiting embodiment, the media system may include instructions that indicate which communications protocols to employ for facilitating media transfer between devices based on a device type of electronic device 10. For example, if electronic device 10 does not include display 212 and/or camera 214, then the media system may indicate that PJSIP should be used, whereas if electronic device 10 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by audio output(s) 210, and/or a speech-to-text ("STT") component capable of converting received audio signals into text to be sent to speech-processing system for processing.

The wakeword database may be a database stored locally by storage/memory 204 of electronic device 10, and may include a list of a current wakeword for electronic device 10, as well as one or more previously used, or alternative, wakewords for voice activated electronic device. In some embodiments, an individual may set or program a wakeword for their electronic device 10. The wakeword may be programmed directly on electronic device 10, or a wakeword or wakewords may be set by the individual via a local client application that is in communication with computing system 200. For example, an individual may use their mobile device having the speech-processing system application running thereon to set the wakeword. The specific wakeword may then be communicated from the mobile device to computing system 200, which in turn may send/notify electronic device 10 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 10. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by audio input(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by audio input(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by audio input(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference MINI models that have been created by training for specific trigger expressions. An MINI model represents a word as a series of states. Generally, a portion of an audio signal is analyzed by comparing its MINI model to an MINI model of the trigger expression, yielding a feature score that represents the similarity of the audio signal model to the trigger expression model.

In practice, an HMM recognizer may produce multiple feature scores, corresponding to different features of the MINI models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 10 may then begin transmitting the audio signal to computing system 200 for detecting and responds to subsequent utterances made by an individual.

In some embodiments, storage/memory 204 may store voice biometric data associated with one or more individuals. For example, an individual that operates electronic device 10 may have a registered user account on computing system 200 (e.g., within accounts system 268). In some embodiments, electronic device 10 may be associated with a group account, and various individuals may have user accounts that are operating under the rules and configurations of the group account. As an illustrative example, electronic device 10 may be associated with a first group account on computing system 200, the first group account being for a family that lives at a household where electronic device 10 is located. Each family member may also have a user account that is linked to the first group account (e.g., a parent, a child, etc.), and therefore each user account may obtain some or all of the rights of the first group account. For example, electronic device 10 may have a first group account on computing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Communications circuitry 206 may include any circuitry allowing or enabling one or more components of electronic device 10 to communicate with one another, and/or with one or more additional devices, servers, and/or systems. For example, communications circuitry 206 may facilitate communications between electronic device 10 and computing system 200. As an illustrative example, audio data representing an utterance (e.g., utterance 4 of FIG. 1) may be transmitted over a network 230, such as the Internet, to computing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 10 and computing system 200. In some embodiments, electronic device 10 and computing system 200 may communicate with one another via a web browser using HTTP. Various additional communication protocols may be used to facilitate communications between electronic device 10 and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 10 may include one or more antennas to facilitate wireless communications with a network using various wireless technologies (e.g., Wi-Fi, Bluetooth, radiofrequency, etc.). In yet another embodiment, electronic device 10 may include one or more universal serial bus ("USB") ports, one or more Ethernet or broadband ports, and/or any other type of hardwire access port so that communications circuitry 206 allows electronic device 10 to communicate with one or more communications networks.

Electronic device 10 may also include one or more audio inputs 208. For example, audio input(s) 208 may correspond to one or more microphones and/or transducers. Furthermore, one or more audio input devices located within a separate device may be in communication with electronic device 10 to capture sounds for electronic device 10. Audio input(s) 208 may be any suitable component capable of detecting audio signals. For example, audio input(s) 208 may include one or more sensors for generating electrical signals and circuitry capable of processing the generated electrical signals. In some embodiments, audio input(s) 208 may include multiple microphones capable of detecting various frequency levels. As an illustrative example, electronic device 10 may include multiple microphones (e.g., four, seven, ten, etc.) placed at various positions about electronic device 10 to monitor/capture any audio outputted in the environment where electronic device 10 is located. The various audio inputs 208 may include some microphones optimized for distant sounds, while some microphones may be optimized for sounds occurring within a close range of electronic device 10. In some embodiments, audio input(s) 208 may only begin to detect audio signals in response to a manual input to electronic device 10. For example, a manually activated device may begin to capture audio data using audio input(s) 208 in response to a user input, such as pressing a button, tapping a touch screen, or providing any touch input gesture to a touch input component.

Electronic device 10 may include one or more audio output(s) 210. For example, audio output(s) 210 may correspond to one or more speakers. Furthermore, electronic device 10 may be in communication with one or more audio output(s) 210. Audio output(s) 210 may correspond to any suitable mechanism for outputting audio signals. For example, audio output(s) 210 may include one or more speaker units, speaker housings, transducers, arrays of speakers, and/or arrays of transducers that may be capable of broadcasting audio signals and or audio content to a surrounding area where electronic device 10 may be located. In some embodiments, audio output(s) 210 may include headphones or ear buds, which may be wirelessly wired, or hard-wired, to electronic device 10, that may be capable of broadcasting audio directly to an individual.

In some embodiments, one or more audio input(s) 208 may serve as input devices to receive audio inputs. Electronic device 10, in the previously mentioned embodiment, may then also include one or more audio outputs 210 to output audible responses. In this manner, electronic device 10 may function solely through speech or audio, without the use or need for any input mechanisms or displays, however this is merely exemplary.

Display screen 212 may correspond to a display device and/or touch screen, which may be any size and/or shape and may be located at any portion of electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 10. For instance, electronic device 10 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 10 may be configured to determine which pixels are associated with a particular location point, and which item or items are also displayed at that pixel location. Furthermore, electronic device 10 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 10, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, content displayed on display screen 212 may be formatted such that contextual entities and lists are able to be analyzed by computing system 200 for list management and anaphora resolution. Context related to the displayed content may include entities associated with electronic device 10 including, but not limited to, foreground entities (e.g., lists of items, detail pages), background entities (e.g., songs, audio books), and notification entities. The contextual metadata may be structured into context entity slots, list metadata, and any other additional data available. For example, contextual entity slots may correspond to data used for list resolution and/or anaphora resolution. The contextual entity slots may be specified in domain definitions with corresponding values. The list metadata may include list identifiers, item identifiers for items of a list, and absolute positions of the list for a particular item (e.g., a first item of a list, a second item of a list, etc.). Such additional data may include unique identifiers associated with an object, item prices, quantities, and the like.

In some embodiments, electronic device 10 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 10 may include multiple cameras 214, such as one or more front-facing cameras and/or one or more rear facing cameras. Furthermore, camera(s) 214 may be configured to recognize far-field imagery (e.g., objects located at a large distance away from electronic device 10) or near-filed imagery (e.g., objected located at a relatively small distance from electronic device 10). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 10. For instance, camera(s) 214 may be external to, and in communication with, electronic device 10. For example, an external camera may be capable of capturing images and/or video, which may then be provided to electronic device 10 for viewing and/or processing.

Persons of ordinary skill in the art will recognize that, in some embodiments, display screen 212 and/or camera(s) 214 may be optional for electronic device 10. For instance, electronic device 10 may function using audio inputs, and outputting audio in response or causing one or more actions to occur in response, and therefore display screen 212 and/or camera(s) 214 may not be included. Furthermore, in some embodiments, electronic device 10 may not include display screen 212 and/or camera(s) 214, but instead may be in communication with display screen 212 and/or camera(s) 214. For example, electronic device 10 may be connected to a display screen via a Wi-Fi (e.g., 802.11 protocol) connection such that visual content sent to electronic device 10 may be sent to the display screen, and output thereby.

In one exemplary embodiment, electronic device 10 may include an additional input/output ("I/O") interface. For example, electronic device 10 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 10 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 10. For example, one or more LED lights may be included on electronic device 10 such that, when audio input(s) 208 receive audio, the one or more LED lights become illuminated signifying that audio has been received by electronic device 10. In some embodiments, one or more vibrating mechanisms or other haptic features may be included with electronic device 10 to provide a haptic response to an individual.

In some embodiments, electronic device 10 may include radio-frequency identification ("RFID") functionality and/or near field communication ("NFC") functionality. Furthermore, in some embodiments, electronic device 10 may include one or more infrared ("IR") sensors and one or more IR emitters. The IR sensors/emitters may be used to determine depth information. For example, in one embodiment, a distance of an individual from electronic device 10 may be determined using the one or more IR sensors/emitters. Depth determination may be performed using any depth determination technique. In some embodiments, a distance between an individual and electronic device 10 may be employed as a basis for presenting content with varying density using display screen 212. In some embodiments, electronic device 10 may include beaconing functionality that allows electronic device 10 to recognize when one or more devices are located nearby. For example, electronic device 10 may include beaconing detection functionality that generates a beaconing signal, and attempts to determine whether any devices nearby are capable of detecting that signal. If so, then that may indicate that a particular device is proximate to electronic device 10.

In some embodiments, contextual metadata may be obtained by computer vision analysis of an object detected by camera(s) 214. For example, in response to speaking the utterance, "Buy this," electronic device 10 may cause camera(s) 214 to capture an image. That image may be analyzed to determine what the object is, and the contextual metadata associated with that objects identify may be determined. For instance, if an individual is holding up a bottle of ketchup, then the computer vision analysis may be able to determine a product name, bar code, and/or any other attribute about the bottle of ketchup from the captured image, and may populate a contextual metadata structure indicating the determined values (e.g., 'Item Name' slot: "Ketchup").

IoT device 20, in some embodiments, may include processor(s) 202, storage/memory 204, communications circuitry 206, and one or more function(s) 216. Optionally, IoT device 20 may also include audio input(s) 208, audio output(s) 210, display screen 212, and/or camera(s) 214. IoT device 20 may be capable of being controlled either individually (e.g., by a user directly) or via electronic device 10. For example, an individual may cause IoT device 20 to perform an action by providing an input to IoT device 20 (e.g., voice input, sound input, manual input, etc.). As another example, an individual may speak an utterance, cause a sound to be produced, and/or provide a manual input to electronic device 10 that, in turn, caused IoT device 20 to perform one or more desired actions.

IoT device 20 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, ovens, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, IoT device 20 may be substantially similar to electronic device 10, with the exception that IoT device 20 may be capable of performing one or more additional functions using function(s) component(s) 216.

Function(s) component(s) 216 may correspond to any suitable components associated with IoT device 20 that causes IoT device 20 to perform one or more specified functions. As an illustrative example, IoT device 20 may correspond to a smart oven, as described above for FIG. 1. In this particular scenario, function(s) component(s) 216 may correspond to one or more heating functions (e.g., an oven that heats, stove top, microwave features, etc.) that allow smart oven 20 to perform the desired functions of an oven. As another example, IoT device 20 may correspond to a laundry machine. Therefore, in this particular scenario, function(s) component(s) 216 may correspond to one or more clothes washing features such that the laundry machine may wash one or more items. Persons of ordinary skill in the art will recognize that IoT device 20 may correspond to any suitable device, and the aforementioned are merely exemplary.

FIG. 2B, in one embodiment, illustrates the exemplary system architecture of FIG. 1, and in particular, computing system 200. Computing system 200 may include various components and modules including, but not limited to, speaker identification system 248, automatic speech recognition ("ASR") system 258, natural language understanding ("NLU") system 260, applications/skills system 262, text-to-speech ("TTS") module 264, and accounts system 268. In some embodiments, computing system 200 may also include an orchestrator system 250 capable of orchestrating one or more processes to be performed by one or more of speaker identification system 248, ASR system 258, NLU system 260, applications/skills system 262, TTS system 264, and/or accounts system 268, as well as one or more additional components, devices, and/or systems associated therewith. Computing system 200 may also include computer readable media, including, but not limited to, flash memory, random access memory ("RAM"), and/or read-only memory ("ROM"). Computing system 200 may also include various modules that store software, hardware, logic, instructions, and/or commands for computing system 200.

ASR system 258 may be configured to recognize human speech in detected audio, such as audio captured by electronic device 10, which may then be transmitted to computing system 200. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by computing system 200, such as the expression detector mentioned above with regards to electronic device 10. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that a particular word or phrase (e.g., a wakeword), is represented within the audio signal. The expression detector may then compare that score to a threshold value to determine whether that word or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 10, computing system 200, or by another device, such as a separate device or server capable of performing one or more additional functionalities thereon (e.g., a television capable of outputting video content).

NLU system 260 may be configured such that it determines an intent of an utterance based on the received audio data. NLU system 260 may determine one or more domains, which may also be referred to as categories, that may be capable of handling the intent of the utterance. For example, an utterance, "Play this," may be identified by a Music domain, an E-Book domain, and a Video domain as possibly being able to handle the corresponding request. For instance, NLU system 260 may identify that the word "Play" may be a recognized intent of each of the aforementioned domains (as well, possibly, other domains). In some embodiments, to determining an utterance's intent, NLU system 260 may communicate with applications/skills system 262 to cause one or more specific functionalities to be accessible, perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 4) as well as the pertinent pieces of information in the text that allow an action to be completed. For example, if a spoken utterance is processed by ASR system 258 and outputs the text, "call mom," NLU system 260 may determine that an intent of the utterance is to activate a telephone, or telephone functionality, and to initiate a call with a contact matching the entity "mom". In some embodiments, NLU system 260 may process several textual inputs related to the same utterance. For example, if ASR system 258 outputs N text segments (as part of an N-best list), then NLU system 260 may process all N outputs.

As will be discussed further below, NLU system 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example using a knowledge base stored within storage/memory 254 of NLU system 260 and/or storage/memory of computing system 200.

To correctly perform natural language understanding processing of speech input, NLU system 260 may be configured to determine a domain of an utterance. By determining the domain, NLU system 260 may narrow down which services and functionalities offered by an endpoint device (e.g., electronic device 10, computing system 200, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of computing system 200. Words in a single text query may implicate more than one service, and some services may be functionally linked (e.g., both a telephone service and a calendar service may utilize data from the contact list).

NER system 272 may be configured to receive a query in the form of one or more results from ASR system 258. NER system 272 may then attempt to identify relevant grammars and lexical information that may be used to construe meaning of the one or more results. To do so, NER system 272 may begin by identifying potential domains that may relate to the received query. NLU system 260, may include a databases of devices within storage/memory 254 of NLU system 260 that may be used to identify domains associated with specific devices. For example, electronic device 10 may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular user account of accounts system 268 and/or electronic device 10. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both communications and music, the query may, substantially in parallel, the natural language understanding processing may use the grammar models and lexical information for communications, and may also use the grammar models and lexical information for music. The responses based on the query produced by each set of models is scored, with the overall highest ranked result from all applied domains is ordinarily selected to be the correct result.

An intent classification ("IC") system 274 may parse the query to determine an intent or intents for each identified domain, where the intent corresponds to the action to be performed that is responsive to the query. Each domain is associated with a database of words linked to intents. For example, a music intent database of a music domain may link words and phrases such as "play," to a play music intent, "stop," to a stop playing music intent, and "mute" to a mute volume intent. IC system 276 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "Play 'Song 1'" is an identified intent, a grammar framework may correspond to sentence structures such as "Play {Song 1}."

NER system 272 may parse the query to identify words as subject, object, verb, preposition, etc., based on grammar rules and/or models, prior to resolving named entities. The identified verb may be used by IC module 274 to identify intent, which is then used by NER system 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart" might produce a result of: {Domain} Shopping, {Intent} "Add item to," {Anaphoric Term}: "this," and {List Type} "cart."

The output from NLU system 260 (which may include tagged text, commands, etc.) may then be sent to orchestrator 250 and/or a command processor, which may be located on, or may be in communication with, computing system 200. The destination command processor may be determined based on the output of NLU system 260. For example, if NLU system 260 outputs include a command to play music, the destination command processor may be a music playing application, such as one located on electronic device 10 or in a music playing application, configured to execute a music playing command to cause a particular audio file to output. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application.

In some embodiments, NLU system 260 may also include an entity resolution module 278, which allows NLU system 260 to query each domain of NLU system 260 to determine which domain or domains believe that they can handle a given request. Upon performing the query, each domain of domain system 272 may return a "score" indicating a likelihood that they can handle the application in question. For instance, various domains may return scores of LOW, MEDIUM, or HIGH, indicating the likelihood that they can handle the particular application. Entity recognition module 278 may return application names or titles for the request, which may be based on relevance scores that estimate a confidence that a particular application may be best used for the request. As an illustrative example, if the utterance is, "Play my music," NLU system 260 may determine, using entity resolution module 278, which domains, and thus applications, can likely handle this request, and may select the domain and/or application having the highest confidence score as being the domain and/or application able to handle the request. Furthermore, as described in greater detail below with reference to FIG. 2B, NLU system 260 may further include a slot filler module 276.

In some embodiments, NLU system 260 may include a contextual resolution system 270, which may be a system configured to identify entities for assisting natural language understanding processing using contextual metadata corresponding to content being displayed by display screen 212. Contextual resolution system 270 may receive contextual metadata from orchestrator 250 (e.g., that may be generated and sent from a particular domain of functionalities 262) and/or from electronic device 10. The contextual metadata my include information associated with the particular content currently being rendered by a requesting device. In some embodiments, the contextual metadata may be obtained in response to receiving audio data. For example, in response to receiving audio data representing utterance 4, voice activated electronic device 10 may send a notification to computing system 200 that indicates that content is currently being rendered by display screen 212.

In one embodiment, orchestrator 250 may be configured to receive the audio data, and may determine that the notification has also been received. Orchestrator 250 may determine whether or not the notification indicates that there is (or was) content displayed by display screen 212 at the time that the utterance was spoken (e.g., when the wakeword was uttered). However, persons of ordinary skill in the art will recognize that the determination of whether content is being displayed by display screen 212 may correspond to a time just prior to the wakeword being uttered, when the wakeword was uttered, after the wakeword was uttered, during the utterance being spoken, after the utterance was spoken, and/or after the audio data is sent to computing system 200, and the aforementioned is merely exemplary. The notification may correspond to a flag, such as a logical I/O, where if the flag has a value of 1, then this may indicate that content is being rendered by electronic device 10, whereas if the flag has a value of 0, then this may indicate that not content is being rendered by electronic device 10.

Upon determining that electronic device 10 is rendering content (e.g., receiving a notification indicating that content is being displayed by display screen 212), orchestrator 250 may generate and send a request to the various domains associated with applications/skills system 262 and NLU system 260. The request may inquire as to which domain, or domains, are currently providing electronic device 10 with content, such as the content being rendered. Upon determining that domain, or domains, that are providing content, orchestrator 250 may request that the identified domain(s) generate and send contextual metadata representing text corresponding to the displayed content. After receiving the contextual metadata from the corresponding domain(s), orchestrator 250 may provide the contextual metadata to contextual resolution system 270, or otherwise cause the contextual metadata to be sent to NLU system 260.

In some embodiments, the various domains may include formatting logic (e.g., speechlets) that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being displayed by display screen 212 an utterance is spoken. For example, single item or detail web page of an item, such as a coffee maker, may include entity data organized into contextual slots such as {Item Name}, {List Position}, and {Item Identifier}. Values from the particular web page being displayed currently by display screen 212 may include: {Item Name}: "Coffee Maker," {List Position}: "1," and {Item Identifier}: "abcd1234." Different types of content may include different contextual slots. For example, lists may include {List Types}, {List Position}, {List Name}, etc.

In some embodiments, contextual resolution system 270 may determine whether any slots/fields from intent resolution processing by NLU system 260 substantially match any slots/fields from the contextual metadata received. For instance, the entity data that is received from the domain may include similar entities (e.g. slots) as the entities associated with the intent identified by NLU system 260.

This may include having contextual slots from the contextual metadata being associated with similar attributes as those of slots from intent resolution by NLU system 260. As an example, the "Play Music" intent may include slots for application data—{Application Data Slot}, song name—{Song Name}, album name—{Album Name}, artist name—{Artist Name}, genre name—{Genre Name}, playlist name {Playlist Name}, media type—{Media Type}, sort type—{Sort Type}, play mode—{Play Mode}, service name—{Service Name}, anaphor—{Anaphor}, list position—{List Position}, recommend trigger—{Recommended Trigger}, and similar trigger—{Similar Trigger}. From NLU system 260, the text data may be used to identify some or all of the values for these slots. For example, if the utterance is, "Play 'Song 1'," then {Song Name} may have a value "Song 1." However, the remaining slots may remain unfilled. The contextual metadata may indicate information regarding a GUI displayed by display screen 212, where the GUI includes a detailed page associated with a song (e.g., "Song 1") or be a list including one item, the song. For example, the contextual metadata may include a song name contextual slot, {Song Name}, with a filled value being "Song 1," as well as an album name contextual slot, {Album Name}, having a filled value "Album 1." In this particular scenario, the album name contextual slot {Album Name} may be provided to NLU system 260.

Contextual resolution system 270, in one embodiment, may be configured to determine a heuristics score that indicates a number of matching entities (e.g., matching slots) between the entity data/contextual metadata and the declared slots for the identified intent. For example, using the previous example, the contextual metadata may include such slots as {Song Name}, {Album Name}, and/or {Artist Name}, amongst other slots. Therefore, in this particular scenario, the heuristics score may be three, indicating that there are three slots corresponding to similar entities for both the declared slots from IC component 274 and contextual resolution system 270. If the heuristics score is greater than zero, then NLU system 260 may be configured to generate a selected context file that may be included with the output data from NLU system 260, which orchestrator 250 may provide back to an application, or applications, of applications/skills system 262 to perform, or attempt to perform, one or more actions.

Applications/skills system 262 may, for example, correspond to various action specific applications, which are capable of processing various task specific actions and/or performing various functionalities. Applications/skills system 262 may further correspond to first party applications and/or third party applications capable of performing various tasks or actions, or performing various functionalities. For example, based on the context of the audio received from electronic device 10, computing system 200 may use a certain application to generate a response, or to obtain response information, which in turn may be communicated back to electronic device 10 and/or to another electronic device (e.g., a television). Applications/skills system 262 may also include processor(s) 252, storage/memory 254, and communications circuitry 256.

In some embodiments, applications/skills system 262 may include an instructions database 280. Instructions database 280 may be accessed by computing system 200 in response to NLU system 260 determining that a request corresponds to a task to be performed using one or more lists of instructions stored thereby. For example, if an individual requests a pizza recipe, then NLU system 260 may recognize that the intent of the request is for a pizza recipe to be provided to the requesting device. The domain associated with this intent may cause computing system 200 to access instruction database 280 to obtain a pizza recipe.

Instructions database 280 may store various lists of instructions of tasks capable of being completed. For instance, lists 282A-N may be stored within instructions database 280. Each list of instructions may differ from one another, however some lists may be similar. For example, two or more pizza recipes may be included by lists 282A-N. Lists 282A-N may, in some embodiments, be written in an extensible markup language ("XML") such that various instructions may be written by a variety of different individuals, companies, and/or systems. For instance, instruction data representing a list of instructions may be stored for each list of lists 282A-N. In some embodiments, additional data, such as display data representing content to be rendered may be stored for each list of instructions 282A-N. For example, the content may correspond to a graphical user interface capable of displaying some or all of a recipe. In response to a particular list being selected for use, the display data may be provided to the corresponding speechlet, which may generate and send the display data to the requesting device.

In some embodiments, instruction database 280 may further store metadata 284A-N. For instance, first list of instructions 282A may be associated with first metadata 284A, which may correspond to metadata related to one or more steps included within first list 282A. As an illustrative example, metadata 284A may include URLs to videos instructing how a particular step of first list 282A may be performed. As another illustrative example, metadata 284A may include command data corresponds to actions that may be performed by one or more devices to accomplish a task associated with first list 282A. Instruction database 280 may also include timers 292A-N. Times 292A-N may be monitored by computing system 200. For example, if first list 282A includes a step that says to bake an item for a certain amount of time, the speechlet associated with the recipe functionality may cause timer 292A to start a timer for that amount of time. At the conclusion of the amount of timer, timer 292A may notify the speechlet that the timer has ended, and the speechlet may cause one or more actions (e.g., prompting the user to remove the item from an oven, sounding an alarm, outputting a message, etc.) to occur. In some embodiments, two or more of timers 292A-N may operate at a substantially same time, albeit unrelated to one another.

A particular list of instructions may be selected based on the various criteria identified by the request. For instance, an instructions domain of NLU system 260 may include slots that may be capable of specifying a task to be performed. In some embodiments, the instructions domain may be associated with such slots as a "Item To Be Made" slot, an "Instruction Builder" slot, and/or a "Task To Be Performed" slot. The "Item To Be Made" slot may specify a specific item that is to be made. For example, if an individual says, "I want to make pizza," the NER system 272 and IC system 274 may parse and tag the word "pizza" to be attributed to the "Item To Be Made" slot. The "Instruction Builder" slot may specify a particular instruction builder with which instructions were created by. For example, if the individual said, "I want to make lasagna using 'Chef 1's' recipe," the "Item To Be Made" slot may be attributed with the value "lasagna," while the "Instruction Builder" slot may be attributed with the value "Chef 1." The "Task To Be Performed" slot, similar, may specify a specific task to be performed. For example, the utterance, "I want to make pizza," may have the "Task To Be Performed" slot attributed with the value "make," indicating that an item is to be made via a list of instructions.

In some embodiments, applications/skills system 262 may further include a storage database 296. Storage database 296 may store inventory data representing information associated with one or more storage devices, such as devices 286A-N, 288A-N, and/or 294A-N. A user account may include a smart storage unit/device/system, which may include sensors, memory, processors, and communications circuitry, amongst other features, capable of determining whether an object is stored by that smart storage device, an amount (e.g., a weight) of the object stored thereby, and a location of that item within/about the smart storage device. As an illustrative example, the user account may be associated with a smart refrigerator. When an object is placed on a shelf in the refrigerator, sensors within the shelf may determine a weight of the object, and may compare that weight against a previously stored weight for the object to determine how much of the object was used. Data, such as sensor data and/or weight data, may be sent to computing system 200 from the storage unit/system/device, and may be stored by storage database 296 as inventory data. Computing system 200 may query storage database 296 to determine whether or not that storage device includes a particular item, and/or an amount remaining of that item. For example, an instructions speechlet may call upon a storage speechlet to access storage database 296. Storage database 296 may access inventory data indicating items stored by one or more storage devices associated with a particular user account to determine whether or not a particular item is stored, as well as, or alternatively, an amount or quantity of that particular item that is being stored. In this way, if instructions data include item metadata associated with items needed for a list of instructions (e.g., ingredients for a recipe), storage database 296 may be capable of determining whether the user has that item and/or whether there is enough of that item remaining for the task associated with the list to be completed. For example, if recipe data includes item metadata indicating an item needed to cook a food item, the recipe speechlet may communicate with the storage speechlet, which may determine, using storage database 296, whether a storage unit/device/system (e.g., a smart refrigerator, smart shelving system) associated with the individual's user account has that item.

In some embodiments, an application of applications/skills system 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

TTS system 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

Speaker identification system 248, in some embodiments, may correspond to any suitable device/system capable of identifying a particular person's voice from an audio signal. Speaker identification system 248 may determine whether a current voice being used to speak matches known voice biometric data associated with a particular individual's voice. In some embodiments, voice biometric data may be stored within accounts system 268 for various individuals having a user account stored thereby. For example, individual 2 may have a user account on computing system 200 (e.g., stored within accounts system 268), which may be associated with electronic device 10. Stored within the user account may be voice biometric data, such as stored vectors representing stored acoustic features associated with a voice of individual 2. Therefore, when an utterance, such as utterance 4, is detected by electronic device 10, and subsequently when audio data representing that utterance is received by computing system 200, speaker identification system 248 may determine whether the voice used to speak utterance 4 matches, to at least a predefined confidence threshold, the stored voice biometric information associated with individual 2 stored by their user account. If so, then this may indicate that individual 2 is the likely speaker of utterance 4.

In some embodiments, speaker identification system 248 may receive audio data representing an utterance, or a copy of the audio data, at a substantially same time as ASR system 258. The audio data may be divided into audio frames representing time intervals, with which a number of values or features representing qualities of the audio data may be determined, along with a set of those values (e.g., feature vectors or audio feature vectors) representing features/qualities of the audio data for each audio frame. For example, each audio frame may include 25 ms of audio, and the frames may start at 10 ms intervals. This may result in a sliding window where adjacent audio frames include 15 ms of overlapping audio. Persons of ordinary skill in the art will recognize that many different acoustic features may be determined, and each feature may be representative of a particular quality of the audio data. Some exemplary approaches that may be used to process the received audio data may include, but art not limited to, mel-frequency cepstral coefficients ("MFCCs"), perceptual linear predictive ("PLP") techniques, neural network feature vector techniques, linear discriminant analysis, and semi-tied covariance matrices. Speaker identification system 248 may also include a scoring component that determines respective confidence scores indicating how likely it is that an input utterance was spoken by a particular user.

When audio data is received by computing system 200, ASR system 258, speaker identification system 248, and/or any other suitable component of speech-processing system 250, may perform windowing functions to the audio data to generate framed audio data. The size of each audio frame may depend on a particular configuration of speech-processing system 250, and persons of ordinary skill in the art will recognize that any audio frame size may be used. For example, as mentioned previously, each audio frame may include 25 milliseconds of audio data, and may overlap with 10 milliseconds of a next audio frame, resulting in a sliding window. Performing a windowing function may include multiplying a time record by a finite-length window with an amplitude that varies smoothly and gradually toward zero at its edges. By performing windowing, endpoints of the waveforms of respective audio frames of audio data meet, resulting in a continuous waveform without sharp transitions. A fast Fourier transform ("FFT") may be performed to convert the waveforms in each audio frame of the framed audio data from its original domain (e.g., time) to a representation in a frequency domain (thereby creating frequency domain framed audio data). Audio processing techniques other than or in addition to FFT may be used to transform audio data (e.g., waveforms) into data that can be processed as needed.

In some embodiments, user recognition feature extraction may be performed on the frequency domain framed audio data. User recognition feature extraction may include performing frame level feature extraction and/or utterance level feature extraction. The frame level feature extraction may determine which frame of a universal background model ("UBM") the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point an endpoint of the speech may be identified and speech processing may end. Feature extraction may, in some embodiments, be performed on all the audio data received from the electronic device 10. Alternatively, feature extraction may only be performed on audio data including speech. Feature extraction and user recognition feature extraction may include determining values (i.e., features) representing qualities of the frequency domain framed audio data, along with quantitating those features into values (i.e., acoustic feature vectors or audio feature vectors). Feature extraction may determine automatic speech recognition feature/vector data, which may assist with speech recognition processing for ASR system 258, and user recognition feature extraction may determine user recognition feature/vector data, which may assist with speaker identification/user recognition for speaker identification system 248. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed.

Speaker identification system 248 may perform speaker identification using various data including user recognition features/vector data, and training data that may correspond to sample audio data corresponding to known users associated with a particular device (e.g., electronic device 10). Speaker identification system 248 may generate confidence scores indicating a likelihood that a particular utterance was spoken by one of the users associated with a particular device, and may determine whether any of these confidence scores is greater than a predefined confidence score threshold. If so, then that may indicate a likelihood that a certain user is the speaker of the utterance. If two or more confidence scores are determined to be in excess of the confidence score threshold, then speaker identification system 248 may select the user having the greater confidence score, or may prompt the device to obtain additional information to resolve the speaker's identity.

In some embodiment, training data may be obtained and stored by accounts system 268. The training data may be stored as waveforms and/or corresponding features/vectors, and may correspond to data from various audio samples, each audio sample associated with a known user and/or user identity. For example, each user known to the system may be associated with some set of training data for the known user. Speaker identification system 248 may then use the training data to compare against incoming audio data (represented by user recognition feature/vector data) to determine an identity of a user speaking an utterance. The training data may be associated with multiple users of multiple devices and therefore may be associated with both a user that spoke the respective utterance, as well as electronic device 10, which provided the audio data representing the spoken utterance.

The training data for a particular user may include a feature vector of the same size as a vector of the user recognition feature/vector data. Thus, for example, if a feature vector is of size F, the training data may also be a feature vector of size F. To create such a training data feature vector, during a training period computing system 200 may either prompt a user to speak sample audio data or may identify sample audio data known to have been spoken by a particular user. The system may then process the sample audio data to create sample training data (e.g., a feature vector of size F). The training data may then be stored by accounts system 268 and saved for use during runtime user verification processing.

In some embodiments, speaker identification processing may further include various additional techniques to determine a speaker of an utterance. For example, device beaconing may indicate a likelihood that a particular individual's device is located proximate to electronic device 10. In this particular scenario, if an individual's device is determined to be substantially close to electronic device 10 at a time when the wakeword is uttered, then this may indicate that the wakeword was likely spoken by that individual. As another example, historical rules may be employed to determine a speaker of an utterance. For example, one particular individual may typically interact with electronic device 10, and therefore it may be more likely that when a wakeword is detected by electronic device 10, that wakeword is more likely than not spoken by that particular individual. Still further, certain individuals may be interact with electronic device 10 during certain times, or to perform certain functions. For example, a particular individual may typically ask for a weather forecast using electronic device 10 during a particular time frame (e.g., between 8 and 9 o'clock). In this particular scenario, if the wakeword is determined to have been uttered during that time frame, then this may indicate that there is a high likelihood that a speaker of the wakeword (and the corresponding utterance) is that individual. As another example, if a particular individual has just performed a specific function, such as sending a message to another individual, then if the wakeword is detected by electronic device 10 temporally after, and within a certain amount of time of, the specific function, then this may indicate that that individual likely spoke the corresponding utterance. Persons of ordinary skill in the art will recognize that various additional techniques may be employed to determine a speaker of an utterance, and the aforementioned are merely exemplary. Speaker identification system 248 may also include processor(s) 252, storage/memory 254, and communications circuitry 256.

Accounts system 268 may store one or more user accounts or user profiles, corresponding to users having an account on computing system 200. For example, a parent may have an account registered on computing system 200, and each of the parent's children may have their own user profile registered under the parent's account. In some embodiments, each account may be identified by a particular account identifier. When a request (e.g., audio data representing an utterance, text data, etc.) is received by computing system 200, an account identifier associated with that request may also be received, which may specify an account identifier associated with a device that the request was received from. Information, settings, and/or preferences, for example, for each user profile may be stored by accounts system 268.

In some embodiments, accounts system 268 may store a voice signal, such as voice biometric information, for a specific user profile. This may allow speaker identification techniques to be used to match a voice to voice biometric data associated with a specific user profile. In some embodiments, accounts system 268 may store a telephone number assigned to a particular user profile. In some embodiments, accounts system 268 may include a list of media items currently stored within an individual's registered account or user profile. For example, a list of music or videos purchased or obtained by an individual may be stored within the individual's user profile on accounts system 268, which may be accessed by the individual when the individual seeks to hear a particular song or songs, or view a particular video or videos. Accounts system 268 may also include a listing of all applications currently enabled for each user profile. In some embodiments, NLU system 260 may receive indications of which applications are currently enabled for a particular user profile or account, such that NLU system 260 is aware of which rules and capabilities that computing system 200 is able to perform for the particular user profile or account.

In some embodiments, accounts system 268 may include a device database 290. Device database 290 may store device information associated with each user account. For example, device database 290 may store device identifiers (e.g., IP addresses, MAC addresses, serial numbers, etc.) for various devices associated with a particular user account. For example, devices 286A-N may be associated with a first user account, devices 288A-N may be associated with a second user account, and devices 294A-N may be associated with an n-th user account.

Orchestrator 250, in a non-limiting embodiment, may correspond to any suitable device, system, and/or logic capable of performing one or more processes. For example, orchestrator 250 may be configured to request contextual metadata from one or more domains/applications of applications/skills system 262 in response to receive a notification from electronic device 10 that content is currently being rendered thereby. In response to receiving the contextual metadata, orchestrator 250 may be configured to provide the contextual metadata to NLU system 260. In one embodiment, orchestrator 250 may include processor(s) 252, storage/memory 254, and communications circuitry 256.

Persons of ordinary skill in the art will recognize that although each of speaker identification system 248, ASR system 258, NLU system 260, applications/skills system 262, TTS system 264, accounts system 268, and orchestrator 250 may each include instances of processor(s) 252, storage/memory 254, and communications circuitry 256, and those instances of processor(s) 252, storage/memory 254, and communications circuitry 256 within each of speaker identification system 248, ASR system 258, NLU system 260, applications/skills system 262, TTS system 264, accounts system 268, and orchestrator 250 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Figure 3A:
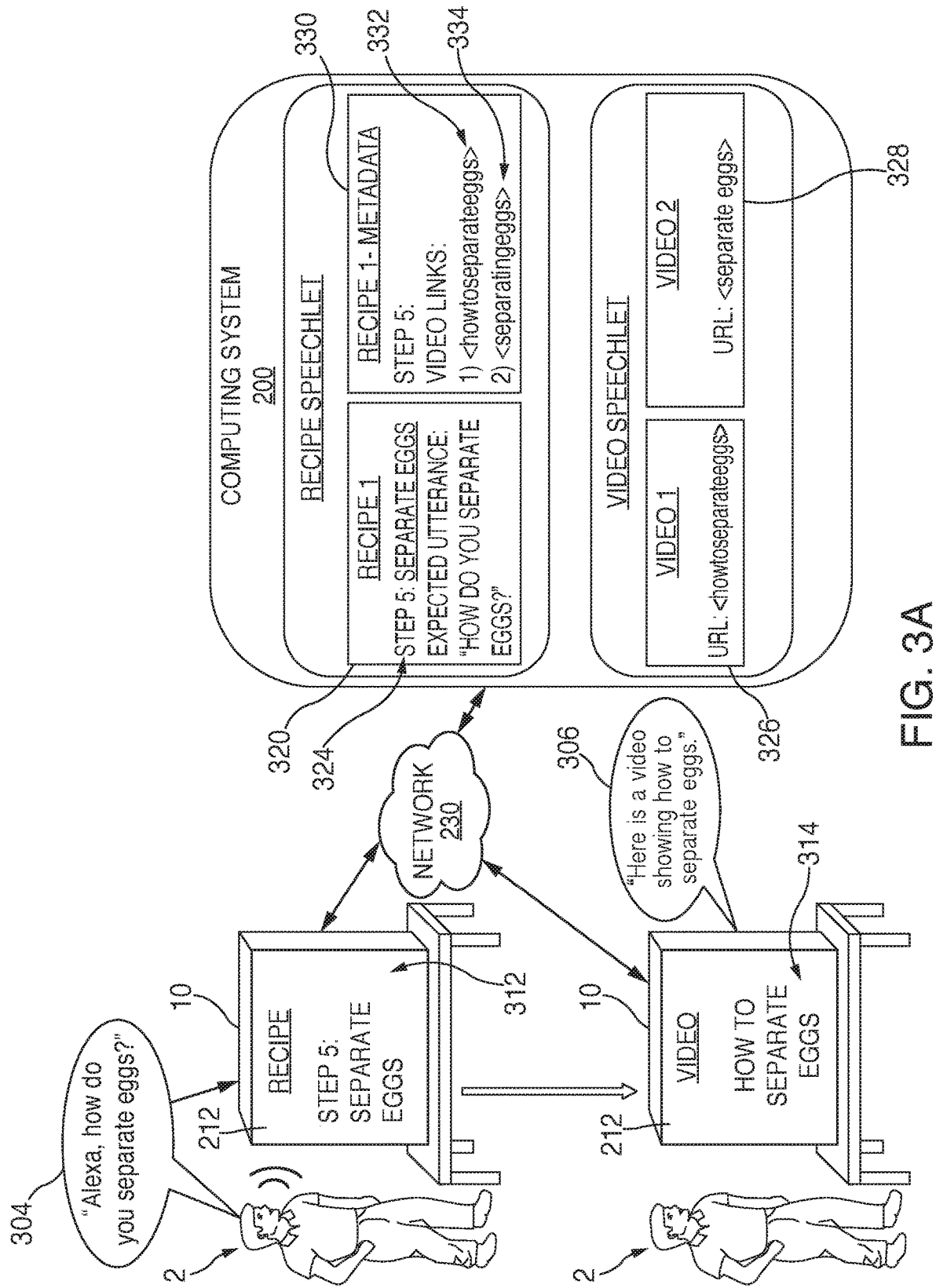
FIG. 3A is an illustrative diagram of an exemplary system for causing supplemental content to be rendered by a device based on content that is being rendered by the device, in accordance with various embodiments.

FIG. 3A is an illustrative diagram of an exemplary system for causing supplemental content to be rendered by a device based on content that is being rendered by the device, in accordance with various embodiments. In the illustrative embodiment, a task may be performed using embedded instructions for a voice user interface ("VUI"). For example, individual 2 may be cooking a food item, or more generally performing a task, using an interactive recipe including embedded instructions, where a portion of the recipe being displayed by display screen 212 of electronic device 10.

In the illustrative embodiment, electronic device 10 may render a GUI 312 may be displayed by display screen 212, which may function in conjunction with a VUI of electronic device 10. The VUI may allow electronic device 10 to function primarily through speech interactions, however persons of ordinary skill in the art will recognize that this merely exemplary. In particular, GUI 312 may display a step of the recipe where a particular action is to be performed. For example, individual 2 may be cooking a recipe that includes a step of separating eggs. If a user does not know, the user may inquire as to how to perform a particular step. For example, the recipe data may include step data representing a step of the recipe indicating that eggs are to be separated. Furthermore, display data representing GUI 312 may be generated and displayed by electronic device 10 based on step data representing a step of the recipe, where the step data includes text data indicating the action (e.g., "separate eggs" step) to be performed by individual 2. If individual 2 does not know how to perform the action associated with that step, individual 2 may say utterance 304, "Alexa, how do you separate eggs?" In response to determining that the wakeword (e.g., "Alexa") was uttered, electronic device 10 may package and send audio data representing utterance 304 to computing system 200. Computing system 200, upon receipt of the audio data, may generate text data representing the audio data using ASR system 258.

Orchestrator 250, in one embodiment, may provide the text data to the recipe speechlet, which may compare the text data to expected utterance text data representing an expected utterance associated with a particular step. When the recipe data is being generated, a recipe builder may include, for certain steps, metadata indicated one or more utterances that an individual may say for that step. For example, for a step corresponding to "separating eggs," the recipe builder may include an expected utterance of "How do you separate eggs?", or "Can you show me how to separate eggs?" Therefore, if an utterance is spoken while a particular step of a recipe is being rendered, then the recipe speechlet may be configured to compare the utterance to the expected utterance to determine whether or not they are similar.

Alternatively, or additionally, in some embodiments, orchestrator component 250 may provide the text data to NLU system 260. Notification data may be provided from electronic device 10 to computing system 200 that indicates that content is currently being rendered by display screen 212. In response to receiving the notification, orchestrator 250 may request that a domain responsible for providing the content identify itself, and send entity data representing the content to NLU system 260. As an illustrative example, a recipe domain may be responsible for the rendered content (e.g., GUI 312), and therefore may send entity data representing content including GUI 312 to NLU system 260. In another embodiment, orchestrator 250 may track which domain is currently responsible for providing content to electronic device 10, and may, upon receiving the notification data, obtain entity data representing the rendered content from that domain. Using the entity data and the text data, NLU system 260 may determine that the intent of utterance 304 is for assistance with a particular step of a list of instructions being rendered by electronic device 10, and may pass output data including slots associated with the intent and the entity data to a recipe speechlet associated with the recipe domain.

The recipe speechlet may determine that the intent of utterance was a request for assistance in performing a step of the recipe. The recipe speechlet may determine the particular step that is being requested to be performed based on the content it is providing as well as its own monitoring of the current state of the recipe. For example, the recipe speechlet may determine that a current step of the recipe is step 5—"Separate Eggs"—based on the fact that the recipe speechlet had recently provided display data representing GUI 312 based on step data representing step 5 to electronic device 10. As an illustrative example, the recipe domain 222 may be configured to facilitate actions associated with a recipe, or generally a list of instructions, using a recipe speechlet. In the illustrative embodiment, first recipe data 320 representing a first recipe—"Recipe 1"—may the current list of instructions being rendered by electronic device 10. Recipe data 320 may include first step data 322 corresponding to step 4 of recipe 1—"Boil Water"—and second step data 324 corresponding to step 5 of recipe 1—"Separate Eggs."

In some embodiments, recipe data 320 may also include recipe metadata 330. Recipe metadata 330 may include supplemental information associated with one or more steps, or aspects, of recipe data 320. For instance, step data 324 may include an expected utterance "How do you separate eggs?" When the text data representing utterance 304 is received by the recipe speechlet, a similarity score may be generated between the text data representing utterance 304, and text data representing the expected utterance. If the similarity score is greater than a similarity score threshold value, then that may indicate that utterance 304 corresponds to one of the expected utterances associated with step data 324.

In response to determine the intent of utterance 304, whether it be using NLU processing or by determining that the similarity score exceeds the similarity score threshold, step metadata associated with step data 324 may be accessed. For instance, first link metadata 332 and/or second link metadata 334 may be accessed, which may correspond to URL links to a first video 326 and a second video 328, respectively. Each of first video 326 and second video 328 may be provided by the recipe builder when generate the recipe data to assist the individual in performing an action associated with second step data 324. As an illustrative example, if step 5 of recipe 1 is for eggs to be separated, first video 326 entitled "How to separate eggs," and second video 328 entitled "Separating eggs," may both be available for that step, as second step data 324 includes first and second link metadata 332 and 334, which indicate links to the aforementioned videos.

In some embodiments, the metadata associated with a particular step may be curated by a builder of that list of instructions. For example, an individual that created recipe data 320 may include first link metadata 332 and second link metadata 334 with second step 324. In this way, when a request is received for assistance associated with second step data 324, the recipe speechlet is able to select one of the provided metadata links. Further still, if two or more pieces of metadata are provided, then upon a request being received that is to use the metadata, the recipe speechlet may be configured to select between one of the two or more pieces of metadata. The recipe speechlet, for example, may be configured to select metadata based on number of times a particular piece of metadata is used, a preference of a user, and/or a preference of a recipe builder.

In the illustrative embodiment, computing system 200 may be configured, after identifying the intent of utterance 304 and obtaining the appropriate metadata for the intent, to generate and send display data representing a new GUI 314. For example, in response to determining that utterance 304 correspond to a request for how to separate eggs, a URL associated with first video 326 may be accessed, and the URL may be provided to electronic device 10 such that video 326 may be streamed from video domain 224 to electronic device 10. In some embodiments, the recipe speechlet may further be configured to generate display data representing GUI 314, which may include first video 326.

In some embodiments, computing system 200, and in particular the recipe speechlet, may be configured to determine text data representing a message that is to be output after identifying content to provide in response to determine the intent of utterance 304. For example, the recipe speechlet may include text data representing a message indicating the video to be output and the subject that it is related to. The recipe speechlet may be configured to provide the text data to TTS system 264, which may generate audio data representing the text data, and the audio data may be sent to electronic device 10. For instance, response 306—"Here is a video showing how to separate eggs"—may be output in response to first video 326 beginning to be streamed by electronic device 10.

Figure 3B:
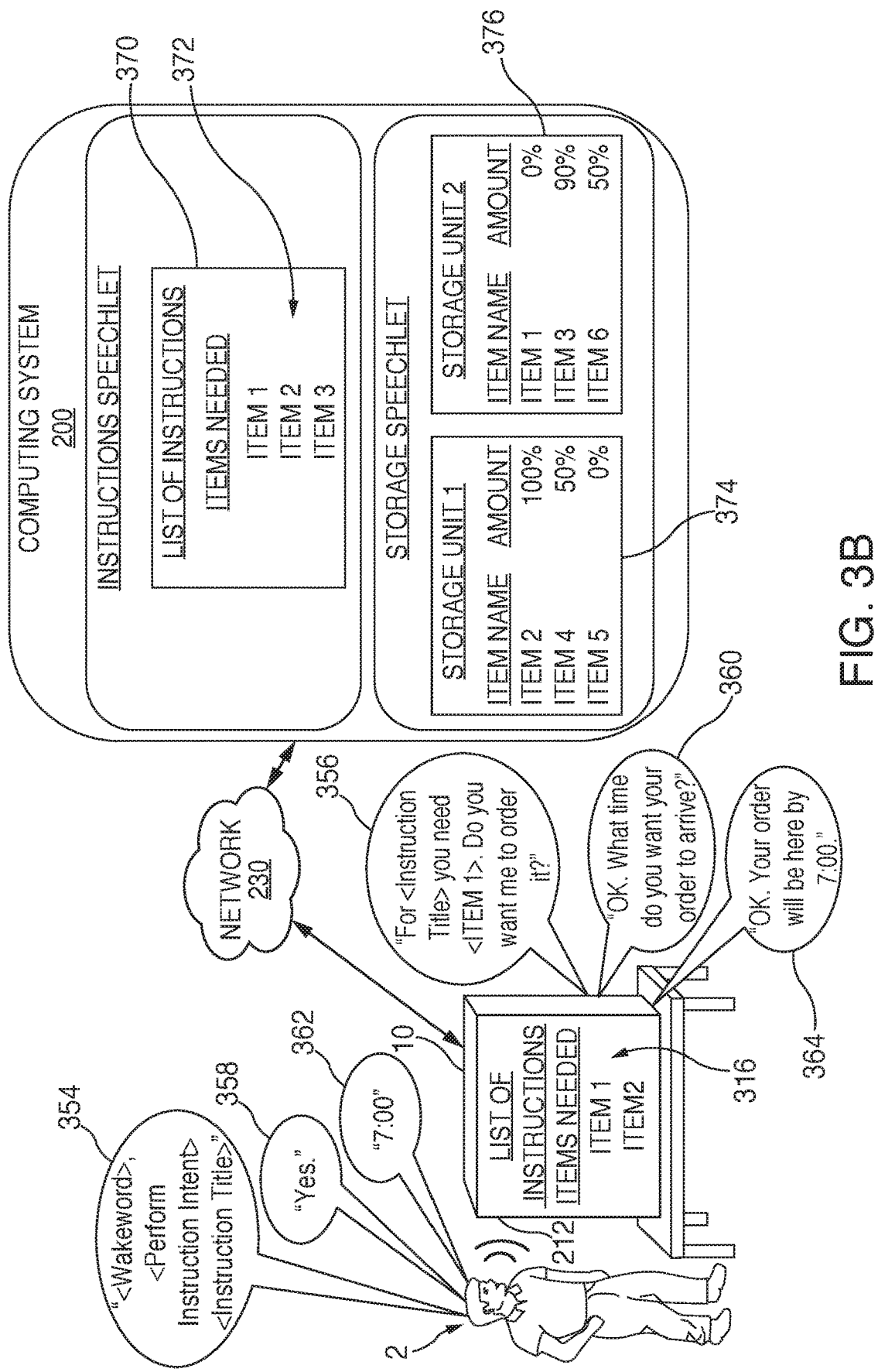
FIG. 3B is an illustrative diagram of an exemplary system for determining that an item associated with a list of instructions is absent, and causing that item to be ordered, in accordance with various embodiments.

FIG. 3B is an illustrative diagram of an exemplary system for determining that an item associated with a list of instructions is absent, and causing that item to be ordered, in accordance with various embodiments. In the illustrative embodiment, individual 2 may speak utterance 354, where individual 2 and electronic device 10 may be located within a same environment. Utterance 354, in one embodiment, may be "<Wakeword>, <Perform Instruction Intent><Instruction Title>," where <Wakeword> corresponds to an exemplary wakeword for electronic device 10 (e.g., "Alexa"), <Perform Instruction Intent> corresponds to an exemplary task to be performed (e.g., cook a pizza), and <Instruction Title> corresponds to an exemplary title of the task. For example, the task may be to make a pizza. In this particular scenario, the instruction intent may be "make" and the instruction title may be "pizza."

In response to determining that the wakeword has been uttered, electronic device 10 may begin packing and sending audio data representing utterance 354 to computing system 200. Upon determining an intent, which may be for a task to be performed, of utterance 354, computing system 200 may identify a list of instructions 360 corresponding to the task. For example, if the task is to make pizza, then the list of instructions may correspond to a recipe to make pizza.

As described previously, instructions database 280 may include list data representing a list of instructions, such as, for example, a recipe. Instructions database 280 may also store metadata associated with the list data. For instance, list data 370, which may be stored by instructions database 280, may represent a list of instructions including one or more instructions to be performed to complete a task (e.g., steps to cook a food item). List data 370 may include instruction data representing various instructions of the list, and list data 370 may also include metadata associated with particular instruction data (e.g., metadata associated with first instruction data representing a first instruction of the list, second instruction data representing a second instruction of the list, etc.). For example, first instruction data representing a first instruction of the list may include first instruction metadata indicating one or more URL links detailing how to perform a particular instruction.

In some embodiments, list data 370 may also include metadata that is unassociated with any one particular instruction. For instance, this metadata may be associated with a preamble portion of list data 370. For example, list data 370 may include item metadata, which may indicate one or more items 362 needed for the task associated with list data 370. The item metadata may be provided, in one embodiment, by a builder when generating the list data. As an illustrative example, the list data may correspond to recipe data representing a recipe, and the item metadata may indicate ingredients needed to cook the food item associated with the recipe.

In some embodiments, computing system 200 may determine that the user account associated with electronic device 10 is also associated with one or more storage devices/system. For example, the user account may be associated with one or more smart storage devices/systems, such as, but not limited to, a smart refrigerator or a smart shelving unit. Each of these storage units may be capable of monitoring and tracking, amongst other features, a type of item stored within that storage unit, an amount (e.g., percentage, weight, etc.) remaining of a particular item, and a location of an item within the storage unit. For example, IoT device 20 may correspond to a smart refrigerator, which may be capable of tracking items stored by the smart refrigerator.

In some embodiments, a storage database may store inventory data corresponding to item information associated with the contents of the one or more storage units/devices/systems associated with the user account. For instance, storage database 296 may store first inventory data representing a first storage unit status 364 associated with a first storage unit. Therefore, information associated with the contents of the first storage unit (e.g., IoT device 20) may be accessible by computing system 200 using storage database 296, and may the inventory data may indicate which items are, or have been, stored by a first storage unit (e.g., a smart refrigerator), as well as an amount of item currently stored within the first storage unit. For example, first storage unit status 364 may indicate that a first storage unit is storing Item 2, Item 4, and Item 5, and the amounts remaining of each of these items may be 100% (e.g., full), 50% (e.g., half full), and 0% (e.g., empty). Similarly, a second storage unit status, corresponding to a second storage unit (e.g., a smart refrigerator, smart shelving unit, etc.) may also be accessible by computing system 200, and may indicate which items are, or have been, stored by the second storage unit, as well as an amount of each item that is currently stored thereby. For example, storage database 296 may store second inventory data representing a second storage unit status 366, which may indicate that the second storage unit may be store Item 1, Item 3, and Item 6, and that the amount remaining of these items are 0% (e.g., empty), 90% (e.g., 90% full), and 50% (e.g., half full), respectively.

An instructions speechlet responsible for executing the actions associated with the particular list of instructions being rendered may receive list data 370 representing a list of instructions, and may determine that list data 370 includes item metadata 372 corresponding to items needed for the task associated with the list of instructions. The instructions speechlet may be configured to determine whether these items are available (e.g., that there is enough of the item to be used for the list) for use in performing the task using the item metadata. For example, upon receiving list data 370, the instructions speechlet may determine that list data 370 includes item metadata 372, and may be configured to access a user account associated with the requesting device to determine whether or not those items are currently stored by any storage units/devices/systems associated with that user account.

The instructions speechlet, in some embodiments, may pass item data representing items to be searched for within a storage unit to a storage speechlet. The storage speechlet may query storage database 296 to determine which of the inquired items are stored by the storage units associated with the user account. In some embodiments, the storage speechlet may further search for an amount of an item. As an illustrative example, item metadata 372 may indicate that Item 1, Item 2, and Item 3 are needed for the task associated with list data 370. The storage speechlet may query storage database 296 to determine whether a first storage unit and a second storage unit currently is storing these items. In the illustrative example, the storage speechlet may determine that Item 2 and Item 3 are available, but Item 1 is unavailable. This information may be passed back to the instructions speechlet, which may be configured to perform and/or execute one or more actions in response.

In some embodiments, if one or more items are determined to be unavailable, computing system 200 may be configured to ask the requesting individual (e.g., individual 2) whether or not he/she would like to purchase that item. For example, the instructions speechlet may determine text data representing a message indicating that an item (e.g., "Item 1") is needed for the task (e.g., "Instructions Title"), and inquiring as to whether individual 2 would like that item to be ordered. For instance, text data representing a message—"For <Instructions Title> you need <Item 1>. Do you want me to order it?" After determining the text data, the instructions speechlet may provide or otherwise cause the text data to be sent to TTS system 264 to generate audio data representing the text data. The audio data may then be sent from computing system 200 to electronic device 10, and output as output audio message 356.

In response to output audio message 356, individual 2 may respond with an utterance 358, "Yes." This may indicate that individual 2 would like to have the item ordered. In some embodiments, individual 2 may speak the wakeword or other activation mechanism prior to speaking utterance 358 (e.g., "Alexa, yes"), however persons of ordinary skill in the art will recognize that this is merely exemplary. Upon receipt of audio data representing utterance 358, text data representing the audio data may be generated and provided to the instructions speechlet and/or NLU system 260. The intent of utterance 358 may be determined to be an affirmative response to the order inquiry of output audio message 356, and this may cause the instructions speechlet to determine text data representing another message asking for a time that the item should be delivered. This text data may be provided to TTS system 264, thereby generating audio data, which may be sent to electronic device 10 and output as output audio message 360. In response to output audio message 360, individual 2 may speak an utterance 362 indicating a time that he/she desires the order to be delivered, "7:00." In response to receiving audio data representing utterance 362, text data representing this audio data may be generated and provided to the instructions speechlet and/or NLU system 260. The intent of utterance 362 may be determined to indicate the time that the order is to be delivered, and this may cause the instructions speechlet to determine text data representing yet another message indicating to individual 2 that the order is being placed and confirm the delivery time. For instance, audio data representing the text data may be generated, and the audio data may be sent to electronic device 10 and output as output audio message 364, "Ok. Your order will be here by 7:00."

Upon determining that the item is to be ordered, the instructions speechlet may access an item purchasing system, which may also be referred to as a purchasing fulfillment system/service, to purchase that item as well as have that item delivered. In some embodiments, the instructions speechlet may generate purchasing data representing the purchasing intent to buy the indicated item (e.g., "Item 1"), and may send the purchasing data to the fulfillment system/service. Furthermore, in some embodiments, upon receiving list data 370 and determining that list data 370 includes item metadata 372, the instructions speechlet may ask individual 2 whether he/she would like to purchase all of the items needed for the task associated with the list of instructions. If so, then the instructions speechlet may generate purchasing data to procure the items indicated as being needed for list data 370 by item metadata 372. For instance, the list data may include item metadata indicating a first plurality of items needed for the task (e.g., a recipe). The item metadata may also indicate amounts of those items needed (e.g., one carrot, two eggs, etc.). The item metadata may then be used to purchase all of the items needed for the task such that the entire set of items needed for the task may be delivered to individual 2.

In some embodiments, the instructions speechlet may be configured to determine display data to be provided to electronic device 10 indicating the items needed for list data 360. For instance, in response to determining that list data 360 representing the list includes item metadata 372, the instructions speechlet may determine and/or generate display data representing GUI 316, and computing system 200 may send the display data to electronic device 10 to be rendered by display screen 212. GUI 316 may include some or all of the items indicated by metadata 362 such that the items may be displayed on display screen 212 such that individual 2 may be capable of viewing the items.

Figure 4A:
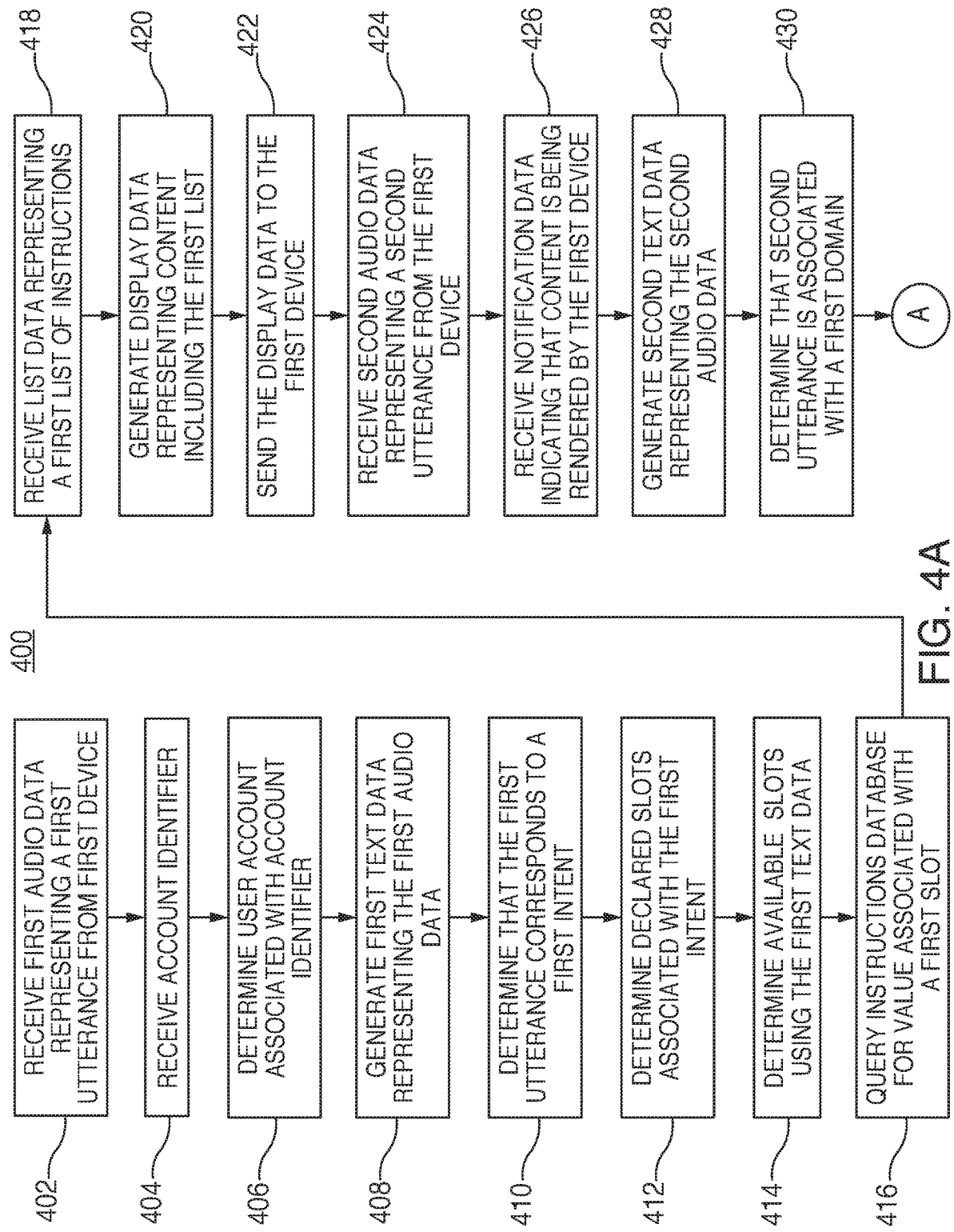

FIGS. 4A and 4B are illustrative flowcharts of an exemplary process for determining an action to be performed by a first device based on list data and audio data output by a second device, in accordance with various embodiments. Process 400, in a non-limiting embodiment, may begin at step 402. At step 402, audio data representing a first utterance may be received from a first device. For example, computing system 200 may receive audio data representing utterance 4 from electronic device 10. In some embodiments, audio data representing an utterance may be sent to computing system 200 in response to a wakeword, trigger expression, or sound, being detected by electronic device 10. For example, in response to individual 2 saying the wakeword "Alexa," electronic device 10 may begin sending audio data representing sounds captured by one or more microphones of electronic device 10 to computing system 200. However, in some embodiments, a manual input being detected by electronic device 10 may alternatively cause electronic device 10 to begin capturing and sending audio data representing sounds received by one or more microphones of electronic device 10 after the manual input is detected.

At step 404, an account identifier may be received. For instance, an account identifier may be received by computing system 200 from electronic device 10 in response to audio data representing an utterance being sent to computing system 200. In some embodiments, the account identifier may be sent to computing system 200 with the audio data, such as the audio data mentioned previously for step 402. For example, the account identifier may be sent as metadata appended to the audio data. At step 406, a user account associated with the account identifier may be determined. For example, accounts system 268 may be queried with the account identifier, and a user account associated with that account identifier may be determined.

At step 408, first text data representing the first audio data may be generated. Upon receipt of the audio data, orchestrator 250 of computing system 200 may provide the audio data to ASR system 258. ASR system 258 may, using grammar rules and models associated therewith, generate text data representing the audio data. Orchestrator 250 may then provide the text data to NLU system 260. At step 410, NLU system 260 may determine that the utterance corresponds to a first intent. For example, NLU system 260 may determine that the utterance corresponds to a request to for a recipe to make pizza, or instructions to build a birdhouse, and the like. In some embodiments, a notification may further be received by computing system 200 from electronic device 10 that indicates that content is currently being rendered by electronic device 10. In this particular scenario, orchestrator 250 may request that a domain responsible for providing the content being rendered by electronic device 10 identify itself, and provide entity data representing the content to NLU system 260. After the domain identifies itself and sends the entity data, NLU system 260 may rank the various intent hypothesis for the utterance using the entity data and the text data to determine the first intent.

At step 412, declared slots associated with the first intent may be determined. For instance, if the intent corresponds to a recipe intent, some exemplary declared slots may be a "Food Item To Be Made" slot, a "Recipe Title" slot, a "Chef" slot, and/or a "Recipe Builder" slot. As an illustrative example, text data representing the utterance, "I want to make 'Pizza' by 'Chef 1'," may be parsed and tagged by NLU system 260. The result may be attributed the value "Pizza" to the "Food Item To Be Made" slot, and the value "Chef 1" to the "Chef" slot. However, persons of ordinary skill in the art will recognize that the aforementioned is merely exemplary. At step 414, available slots may be determined using the first text data. For instance, using the previous example, the available slots may be the "Food Item To Be Made" slot and the "Chef" slot, however different slots may be applicable for different intents, and different available slots may be determined for different utterances.

At step 416, instructions database 280 may be queried. For instance, using the values associated with the available slots determined at step 414, instructions database 280 may be searched for lists of instructions (e.g., one or more of lists 282A-N) that correspond to the intended instructions requested by the utterance. For example, if the utterance is, "I want to make pizza using 'Chef's' recipe," instructions database 280 may search through lists 282A-N for lists that include an item to be made being pizza (e.g., {Item To Be Made}: "Pizza") and a chef being "Chef" (e.g., {Chef}: "Chef").

At step 418, list data representing a first list of instructions may be received. The first list of instructions may correspond to instructions stored by instructions database 280 that corresponds to the instructions desired by the utterance. For example, the list of instructions may correspond to a recipe (e.g., a pizza recipe), and therefore recipe data representing the recipe may be received. In some embodiments, if two or more lists of instructions are determined to match the intended result, then computing system 200 may prompt a requesting device to select between the two or more lists. For example, if individual 2 wants to make pizza, and instructions database 280 includes a first pizza recipe and a second pizza recipe, computing system 200 may generate a message to be sent to electronic device 10 to selected between the two pizza recipes. The message may be audio and/or video, and may indicate to individual 2 that two recipes were found substantially matching the requested recipe. In this particular scenario, individual 2 may select one of the two prompted recipes via voice and/or manual input (e.g., touching a touch screen), and computing system 200 may be configured to render recipe data representing the selected recipe in response.

At step 420, display data representing content including the first list of instructions may be generated. For example, list data representing the list of instructions may include, or may indicate, a GUI to be displayed by a requesting device. For instance, the list data may include instructions data representing an instruction of the list, and the instructions data may include text data representing an action to be performed by a human. Upon identifying the list data, the instructions speechlet may be configured to generate display data that represents at least a portion of the list (e.g., one or more instructions). At step 422, the display data may be sent to the first device. For example, computing system 200 may send display data representing GUI 112 to electronic device 10. Upon receipt, electronic device 10 may display GUI 112 using display screen 212. The list data may include first instruction data corresponding to a first instruction of the list. For example, recipe data may include first step data representing a first step of the recipe. The first instruction data may include text data that is intended for presentation to a human and describes a first action for the human to do to prepare the first food item, and the text data may be included within the display data provided to electronic device 10.

At step 424, second audio data representing a second utterance may be received from the first device. For example, second audio data representing utterance 4 may be received by computing system 200 from electronic device 10. As mentioned previously, in some embodiments, the second audio data may be sent to computing system 200 in response to electronic device 10 determining that a wakeword (e.g., "Alexa") had been uttered within a local environment where electronic device 10 is located. At step 426, notification data indicating that content is being rendered by the first device may be received by computing system 200. In some embodiments, in response to an utterance including a wakeword, a trigger expression being detected, and/or a manual input being detected, electronic device 10 may be configured to determine a current device state. The current device state may correspond to a status of whether or not content is currently being provided to electronic device 10, and/or whether or not content is currently being rendered by electronic device 10. Content, as described herein, may refer to display content (e.g., a GUI, a web-view, an image, etc.) capable of being displayed by a display screen, and/or audio content (e.g., an audio file) capable of being output by an audio output component. Upon the trigger (e.g., wakeword, trigger expression, manual activation) being detected, electronic device 10 may determine whether or not any content is being rendered thereby, and send notification data to computing system 200 indicating whether or not content is being rendered. For example, a TRUE/False, or logical I/O may be sent to computing system 200, where TRUE or a logical 1 may indicate that content is being rendered, whereas FALSE or a logical 0 may indicate that content is currently not being rendered. However, persons of ordinary skill in the art will recognize that any suitable metadata reflecting the current device state may be employed, and the aforementioned is merely exemplary. At step 428, second text data representing the second audio data may be generated. For instance, upon receipt, orchestrator 250 may provide the audio data to ASR system 258, which in turn may generate text data representing the audio data.

At step 430, computing system 200 may determine that the second utterance is associated with a first domain. For instance, orchestrator 250 may determine that the instructions domain is currently responsible for providing content to electronic device, and may determine that the intent of the second utterance is likely associated with the instructions domain. Alternatively, the text data may be provided to NLU system 260 which may determine that an intent of the utterance is associated with the instructions domain.

At step 432, entity data representing the rendered content may be received. For instance, upon receiving the notification data, orchestrator 250 may send a request to the various domains associated with computing system 200. The request may ask that any domain responsible for providing content to electronic device 10 identify itself, as well as provide entity data representing that content to NLU system 260. In some embodiments, each domain may be configured to format content to be provided to devices in a manner consistent with the various slots associated with intents related to that domain. For example, the music domain may include intents associated with listening to music, and these intents may include such slots as "Song Title" slots, "Album Title" slots, and "Artist Title" slots. Therefore, content rendered by a functionality associated with the music domain may be formatted to, if available, include "Song Title" slots, "Album Title" slots, and "Artist Title" slots and their associated values. However, persons of ordinary skill in the art will recognize that the aforementioned is merely exemplary and, alternatively, orchestrator 250 may request the entity data from the first domain based on orchestrator 250 knowing that the first domain is currently responsible for providing the rendered content to the first device. As an illustrative example, if a recipe domain is currently responsible for providing content to electronic device 10 (e.g., display data representing a recipe), then the recipe domain may send entity data representing that content (e.g., entity data representing GUI 112) to NLU system 260. In some embodiments, the first domain may provide the entity data to orchestrator 250, which may in turn provide the entity data to NLU system 260.

At step 434, contextual slots may be extracted from the first entity data. For instance, contextual resolution system 270 may be configured to receive the entity data, and determine what slots are included within that entity data. For example, if the entity data representing GUI 112 is received by contextual resolution system 270, the entity data may indicate that a "Recipe Name" slot, a "Step" slot, and a "Step Action" slot are included. The "Recipe Name" slot, for instance, may correspond to the recipe name of a recipe being displayed by GUI 112 (e.g., "Pizza"), the "Step" slot may correspond to a particular step of the recipe that is currently being, or to be, performed, (e.g., "Step 1"), and the "Step Action" slot may correspond to an action to be performed by the current step (e.g., "Preheat the oven to 400 F").

At step 436, the instructions speechlet may determine that the list data includes first instruction data representing a first instruction of the list of instructions. For example, if the list data corresponds to recipe data representing a recipe, then a recipe speechlet may determine that the recipe data include first step data representing a first step of the recipe. In some embodiments, the first instruction data may include text data that is intended for presentation to individual 2 and describes a first action for individual to do to complete the task. For example, the first instruction data may include text data representing a message "Pre-Heat Oven To 400 Degrees."

At step 438, the second utterance may be determined to correspond to the first instruction data. For example, upon receipt of the second text data, the instructions speechlet may determine expected utterances associated with the first instruction data. The second text data may be compared to text data representing the expected utterance(s), and a similarity score between the two may be generated. If the similarity score is greater than a predefined similarity score threshold, then this may indicate that the second utterance corresponds to one of the expected utterances. Alternatively or additionally, NLU system 260 may further determine that the second intent corresponds to a first step of the first list of instructions being rendered by electronic device 10 using the contextual slots extracted from the first entity data. For example, if the instruction is to "pre-heat the oven" then the utterance may be determined to correspond to a "Cause Oven To Perform Action" intent. As another example, if the step is "separate eggs," then the utterance may correspond to a "Request For Assistance" intent.

At step 440, first instruction metadata associated with the first instruction data may be determined. Various instructions of a list of instructions may include associated metadata. For example, if a first step of a recipe is for an oven to be heated, then metadata associated with that step may indicate a temperature that the oven is to be heated to. As another example, if the step is to separate eggs, the metadata may indicate various videos, or URL links to videos, that can show a user how to accurately perform that action. At step 442, the instructions speechlet may determine that the first instruction data corresponds to an action to be performed. In one embodiment, based on the slots and values associated with those slots from intent resolution performed by NLU system 260, the first step may be determined to correspond to an action. For example, the first step may be to pre-heat an oven, turn on a machine, or cause another device/system to perform a specific action. As another example, the first instruction data representing the first instruction may be associated with first instruction metadata indicating an action to be performed, a device type associated with the action, and/or items needed for that action.

At step 444, a determination may be made as to whether the user account includes a device associated with the action to be performed. For example, the first instruction metadata may indicate a type of device associated with the first action. Using the first instruction metadata, the user account may be accessed to determine whether any additional devices are associated with the user account of the same type of device. If, at step 444, it is determined that there is a second device associated with the action to be performed that is associated with the user account, then process 400 may proceed to step 446. For instance, computing system 200 may determine that a second device associated with the user account is capable of performing the action. In some embodiments, if the action to be performed involves a specific device, at step 442, then the instruction data may be associated with metadata that indicates a device type capable of performing that action. Continuing the aforementioned example, the instructions speechlet may determine that a smart oven is needed to execute the action associated with a first instruction. The instructions speechlet may also determine that the user account with which the first device is associated may also be associated with a second device capable of performing that action. For example, if IoT device 20 corresponds to a smart oven, then smart oven 20 may be capable of being used to perform the action associated with a first step of a recipe.

At step 446, command data may be generate that includes, at least, the first instruction metadata. For example, the recipe speechlet may generate command data representing a "pre-heat oven" command that includes first metadata indicating the first temperature to be used for the pre-heat oven action. At step 448, third text data representing a first message indicating that the action is being performed by the second device. For example, if the action is for an oven to be pre-heated, and the user account includes a smart oven, then the message may be "Ok. Pre-heating your oven." For instance, the instructions speechlet may determine that, in response to the command data being sent, that the first device is to be updated to indicate that the action associated with the first instruction data is being performed. At step 450, third audio data representing the third text data may be generated. For example, the third text data may be provided to TTS system 264, which may generate the third audio data.

At step 452, the command data may be sent to the second device. For instance, the instructions speechlet may send the command data to IoT device 20. Furthermore, at step 454, the third audio data may be sent to the first device. For example, the message indicating that the action is being performed by the second device may be sent to electronic device 10. For instance, audio data representing message 6, "Ok. Here is the pizza recipe. Pre-heating your oven to 400 F," may be sent to electronic device 10 from computing system 200. In some embodiments, steps 452 and 454 may occur substantially in parallel, however this is merely exemplary.

If, at step 444, it is determined that there are no devices associated with the user account that are also associated with the action (e.g., no devices of a type of device associated with the action), then process 400 may proceed to step 456. At step 456, fourth text data representing a message indicating the action to be performed by the individual may be determined. For example, this message may be, "Please set your oven to 400 degrees." As there are no IoT devices associated with the user account, individual 2 may need to perform the action. At step 458, fourth audio data representing the third text data may be generated. For instance, the fourth text data may be provided to TTS system 264, which may generate fourth audio data. At step 460, the fourth audio data may be sent to the first device. For example, electronic device 10 may output the message in response to receiving the fourth audio data.

Figure 5:
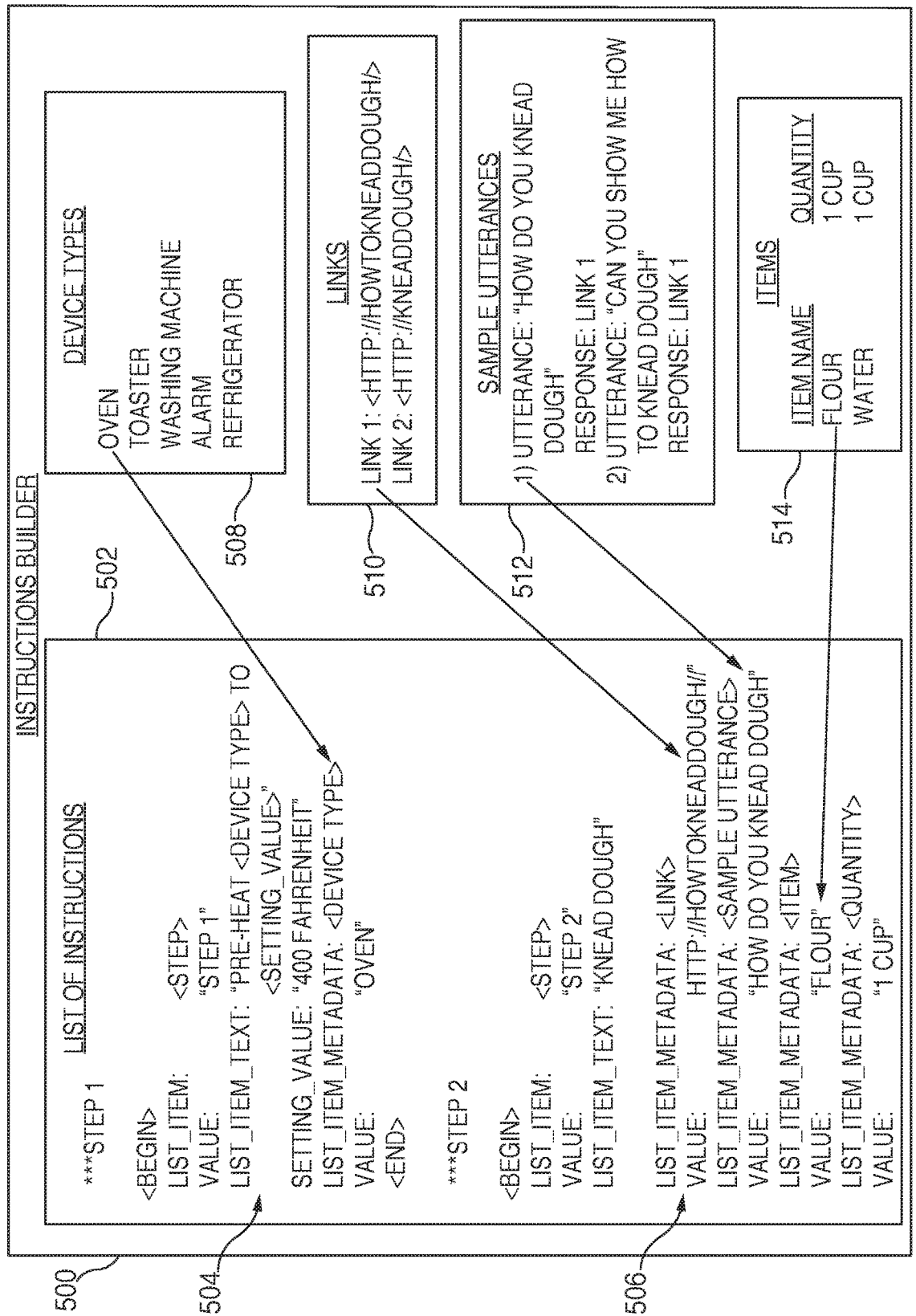
FIG. 5 is an illustrative diagram of an exemplary graphical user interface including an instructions builder for generating instruction data, in accordance with various embodiments.

FIG. 5 is an illustrative diagram of an exemplary graphical user interface including an instructions builder for generating instruction data, in accordance with various embodiments. Instructions builder interface 500, in a non-limiting example embodiment, may include a text portion 502 capable of being written and edited by an individual. For example, computing system 200 may include software allowing individuals to develop and publish instruction data using instructions builder interface 500. In some embodiments, text portion 502 may be formatted using an XML language, however any suitable programming language/ system may be employed. In the illustrative non-limiting embodiment, the list of instructions may correspond to a recipe. In this particular scenario, the list data may correspond to recipe data, and the instruction data representing instructions of the list of instructions may correspond to step data representing steps of the recipe. However, persons of ordinary skill in the art will recognize that this is merely exemplary.

In the illustrative embodiment, text portion 502 may include a first text portion 504 and a second text portion 506. First text portion 504 may include information associated with a first step of a list of instructions, and second text portion 506 may include information associated with a second step of the list. For example, first text portion 504 may correspond to first step data while second text portion 506 may correspond to second step data. Each text portion may indicate various features associated with that step. For example, the first step of the list of instructions is "Step 1—"Pre-heat oven to 400 degrees Fahrenheit." In this particular example, various entities may be attributed values by a recipe builder such that an action associated with the first step may be performed. In some embodiments, first text portion 504 may also include metadata associated with the first step. For example, the metadata may indicate that a device type corresponding to an "oven" may be needed for the first step.

In some embodiments, a menu of available device entities 508 may be provided to the recipe builder. The recipe builder may be capable of dragging and dropping a particular entity into slot data for a particular step such that the corresponding entity is identifiable by NLU system 264. In one embodiments, instruction builder interface 500 may be capable of recognizing entities within text as the text is being input. For example, as an individual starts typing the letters "o-v," interface 500 may recognize that the individual may be typing out the entity "oven," and may allow the individual to use the entity without the need to complete the remaining letters. For example, the individual may accept the suggested entity "oven" for use within first text portion 504.

Second text portion 506 may, in the illustrative embodiment, correspond to second step data representing a second step of the list of instructions. Second text portion 506 may include entities attributed with values, such as a "Step" slot having a value "Step 2," and associated text, "Knead Dough." Additionally, second text portion 506 may include various metadata associated with different features of the second step. One such feature may be link data capable of providing supplemental information to a recipient of the list data for the second step. For example, the recipe builder may include links to websites within link menu 510. Link menu 510 may be populated by a builder to include information, such as, but not limited to, video, audio, and contextual information, associated with an action to be performed by the second step.

In some embodiments, the links included within link menu 510 and associated with second text portion 506 may correspond to links to be provided in response to an expected utterance being spoken. The builder may input sample utterances within a sample utterance menu 512 that may be spoken during that particular step. For example, if the step is "knead dough," some common utterances that may be spoken may include, "How do you knead dough?", or "Can you show me how to knead dough?" When second step data representing the second step is being rendered and an utterance is spoken, a comparison may be made by an instructions speechlet to determine whether to utterance corresponds to one of the expected utterances. If so, particular link data may be provided to the requesting device. As an illustrative example, when the second step is being rendered, an individual may ask "How do you knead dough?" Text data representing the utterance may be generated and compared with text data representing the sample utterance. If a similarity score between the two sets of text data is greater than a predefined threshold value, then this may indicate that the utterance spoken is the expected utterance, and therefore a particular link to a video (e.g., http://howtoneeddough/) may be provided to the requesting device.

Further still, second text portion 506 may include item metadata indicating one or more items needed for the instructions. A builder may insert the items into item menu 514, as well as a quantity of the item needed for the instructions. This way, the instructions speechlet may determine items needed for the list, and may be capable of determining whether any of those items need to be ordered. In some embodiments, items listed within items menu 514 may be associated with entities attributed to slots within NLU system 260 such that NLU system 260 may resolve text to a particular entity. For example, if an utterance includes the text "flour," then that text may be resolved to the entity "flour" (e.g., the food item).

Figure 6:
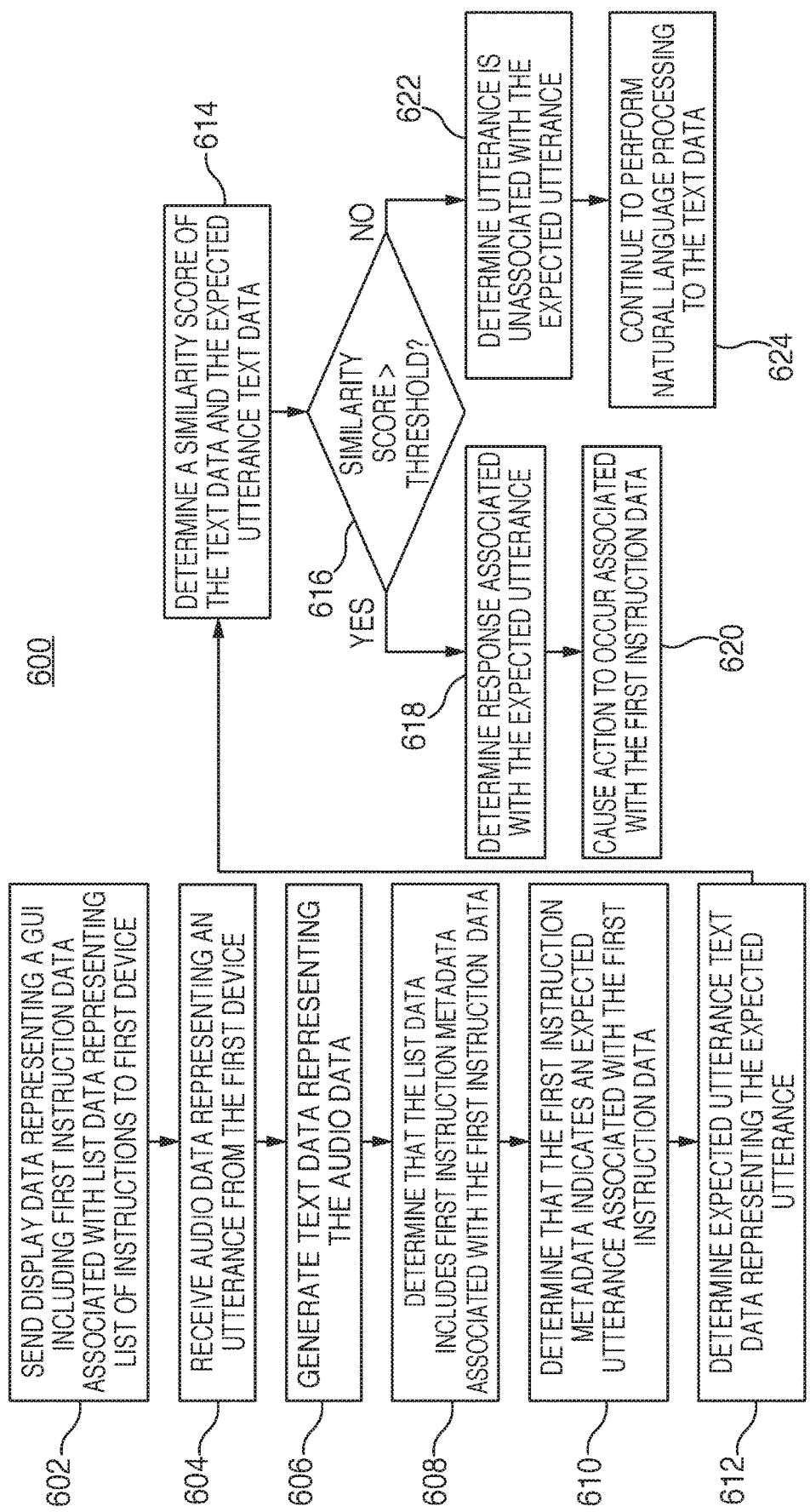
FIG. 6 is an illustrative flowchart of an exemplary process for determining whether an utterance corresponds to an expected utterance associated with instruction data representing an instruction of a list of instructions, in accordance with various embodiments.

FIG. 6 is an illustrative flowchart of an exemplary process for determining whether an utterance corresponds to an expected utterance associated with instruction data representing an instruction of a list of instructions, in accordance with various embodiments. Process 600 may, in a non-limiting embodiment, begin at step 602. At step 602, display data representing a GUI including first instruction data associated with list data representing a list of instruction may be sent to a first device. For example, display data representing GUI 12 including text data indicating a first action that an individual is to do to for a pizza recipe may be sent from computing system 200 to electronic device 10. Upon receipt, electronic device 10 may be configured to display GUI 12 using display screen 212.

At step 604, audio data representing an utterance may be received from a first device. For example, audio data representing utterance 304 may be received by computing system 200 from electronic device 10. In one embodiment, the utterance may be spoken as the GUI is being rendered by display screen 212. At step 606, text data representing the audio data may be generated. For instance, upon receipt of the audio data, orchestrator 250 may provide the audio data to ASR system 258, which may generate text data representing the audio data.

At step 608, a determination may be made that the list data includes first instruction metadata associated with first instruction data representing a first instruction of the list of instructions. For example, a recipe speechlet rendering the recipe data may determine that the recipe data includes first step data representing a first step (e.g., "Knead dough"). The recipe speechlet may further determine that the recipe data includes first step metadata associated with the first step data. At step 610, the instruction speechlet may determine that the first instruction metadata indicates an expected utterance associated with the first instruction data. In one embodiment, the first instruction metadata may correspond to one or more utterances that could be spoken when the first instruction data is being rendered. For example, a sample expected utterance may be "How do you knead dough?" Additional first instruction metadata may correspond to links to videos detailing how to perform an action associated with the first instruction data such that, if the sample expected utterance is determined to have been uttered, that video link may be provided to electronic device 10. At step 612, expected utterance text data representing the expected utterance may be determined. For instance, the recipe data may include the expected utterance text data representing the expected utterance.

At step 614, a similarity score may be determined for the text data and the expected utterance text data. The similarity score may indicate how similar to the utterance that was spoken is to an expected utterance associated with the first step data. At step 616, a determination may be made as to whether the similarity score is greater than a predefined similarity score threshold. If, at step 616, it is determined that the similarity score is greater than the predefined similarity score threshold, then process 600 may proceed to step 618. At step 618, a response associated with the expected utterance may be determined. For example, the response may indicate that a link to a video associated with the first step (e.g., a "how to" video) is being provided. At step 620, an action may be caused to occur that is associated with the response. For instance, the link to the video may be sent to electronic device 10. In some embodiments, if the similarity score is determined to be greater than the similarity score threshold, then this may indicate that the utterance is an expected utterance, and therefore a pre-set rule is to be implemented. For example, the pre-set rule may be to prompt a particular video to the requesting device, however persons of ordinary skill in the art will recognize that this is merely exemplary.

If, however, at step 616, the similarity score is determined to be less than or equal to the predefined similarity score threshold, then process 600 may proceed to step 622. At step 622, the utterance may be determined to be unassociated with the expected utterance. At step 624, the text data may be provided to NLU system 260 such that natural language understanding processing may be continue to be performed to the text data. In some embodiments, the text data may, in parallel to determining the similarity score, be provided to NLU system 260. In this particular scenario, NLU processing may cease if the similarity score is determined to be greater than the similarity score threshold, however NLU processing may otherwise continue.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
    receiving, from a first device associated with a user account, audio data representing a user input;
    determining the user input corresponds to a task;
    determining first data corresponding to a list of instructions associated with the task, the list of instructions to be performed in a particular order;
    determining the list of instructions comprises a first instruction;
    determining the user account is associated with a second device configured to perform functionality associated with the first instruction; and
    causing the second device to perform the functionality.

2. The method of claim 1, further comprising:
    receiving, from the first device, second audio data representing a second user input;
    determining the first data comprises metadata associated with the first instruction, the metadata representing a third user input associated with the first instruction;
    determining a similarity between the second user input and the third user input; and
    based at least in part on the similarity, performing natural language processing with respect to the second user input.

3. The method of claim 1, further comprising:
    receiving, from the first device, second audio data representing a second user input;
    determining the first data comprises metadata associated with the first instruction, the metadata representing a third user input associated with the first instruction;
    determining a similarity between the second user input and the third user input; and
    based at least in part on the similarity, determining a pre-established response to the second user input.

4. The method of claim 3, further comprising:
    determining the pre-established response by determining the first data comprises second metadata associated with the first instruction, the second metadata corresponding to a link to visual content corresponding to the first instruction; and
    sending the link to the first device.

5. The method of claim 1, further comprising:
    determining the first data comprises metadata associated with the first instruction, the metadata indicating a device type; and
    determining the second device corresponds to the device type,
    wherein the second device is caused to perform the functionality based at least in part on the metadata indicating the device type and the second device corresponding to the device type.

6. The method of claim 1, further comprising:
    determining the first data comprises metadata indicating an item associated with the task;
    determining the user account is associated with a third device configured to store items;
    determining an item database associated with the user account, the item database comprising inventory data indicating at least one item stored by the third device;
    determining an absence of the item within the item database; and
    sending, to the first device, second data indicating the absence.

7. The method of claim 6, further comprising:
    sending, to the first device, third data requesting whether the item is to be purchased;
    receiving fourth data representing a second user input;
    determining the second user input indicates the item is to be purchased;
    generating fifth data representing a request to purchase the item, the fifth data comprising an account identifier associated with the user account; and
    sending the fifth data to a purchase fulfillment system.

8. The method of claim 1, further comprising:
    receiving, from the second device, second data indicating the functionality has been performed; and
    sending, to the first device, third data representing the functionality has been performed.

9. The method of claim 1, further comprising:
    determining the list of instructions comprises a second instruction;

determining the second instruction is associated with a device type;
determining the user account is unassociated with a device corresponding to the device type; and
sending, to the first device, second data representing the second instruction.

10. The method of claim 1, further comprising:
determining an amount of time associated with the first instruction;
determining the amount of time has elapsed;
determining the list of instructions comprises a second instruction, the second instruction following the first instruction in the list of instructions;
sending, to the first device, second data representing the amount of time has elapsed; and
sending, to the first device, third data representing the second instruction.

11. A system, comprising:
at least one processor; and
at least one memory comprising instructions that, when executed by the at least one processor, cause the system to:
receive, from a first device associated with a user account, audio data representing a user input;
determine the user input corresponds to a task;
determine first data corresponding to a list of instructions associated with the task, the list of instructions to be performed in a particular order;
determine the list of instructions comprises a first instruction;
determine the user account is associated with a second device configured to perform functionality associated with the first instruction; and
cause the second device to perform the functionality.

12. The system of claim 11, wherein the at least one memory further comprises instructions that, when executed by the at least one processor, further cause the system to:
receive, from the first device, second audio data representing a second user input;
determine the first data comprises metadata associated with the first instruction, the metadata representing a third user input associated with the first instruction;
determine a similarity between the second user input and the third user input; and
based at least in part on the similarity, perform natural language processing with respect to the second user input.

13. The system of claim 11, wherein the at least one memory further comprises instructions that, when executed by the at least one processor, further cause the system to:
receive, from the first device, second audio data representing a second user input;
determine the first data comprises metadata associated with the first instruction, the metadata representing a third user input associated with the first instruction;
determine a similarity between the second user input and the third user input; and
based at least in part on the similarity, determine a pre-established response to the second user input.

14. The system of claim 13, wherein the at least one memory further comprises instructions that, when executed by the at least one processor, further cause the system to:
determine the pre-established response by determining the first data comprises second metadata associated with the first instruction, the second metadata corresponding to a link to visual content corresponding to the first instruction; and
send the link to the first device.

15. The system of claim 11, wherein the at least one memory further comprises instructions that, when executed by the at least one processor, further cause the system to:
determine the first data comprises metadata associated with the first instruction, the metadata indicating a device type; and
determine the second device corresponds to the device type,
wherein the second device is caused to perform the functionality based at least in part on the metadata indicating the device type and the second device corresponding to the device type.

16. The system of claim 11, wherein the at least one memory further comprises instructions that, when executed by the at least one processor, further cause the system to:
determine the first data comprises metadata indicating an item associated with the task;
determine the user account is associated with a third device configured to store items;
determine an item database associated with the user account, the item database comprising inventory data indicating at least one item stored by the third device;
determine an absence of the item within the item database; and
send, to the first device, second data indicating the absence.

17. The system of claim 16, wherein the at least one memory further comprises instructions that, when executed by the at least one processor, further cause the system to:
send, to the first device, third data requesting whether the item is to be purchased;
receive fourth data representing a second user input;
determine the second user input indicates the item is to be purchased;
generate fifth data representing a request to purchase the item, the fifth data comprising an account identifier associated with the user account; and
send the fifth data to a purchase fulfillment system.

18. The system of claim 11, wherein the at least one memory further comprises instructions that, when executed by the at least one processor, further cause the system to:
receive, from the second device, second data indicating the functionality has been performed; and
send, to the first device, third data representing the functionality has been performed.

19. The system of claim 11, wherein the at least one memory further comprises instructions that, when executed by the at least one processor, further cause the system to:
determine the list of instructions comprises a second instruction;
determine the second instruction is associated with a device type;
determine the user account is unassociated with a device corresponding to the device type; and
send, to the first device, second data representing the second instruction.

20. The system of claim 11, wherein the at least one memory further comprises instructions that, when executed by the at least one processor, further cause the system to:
determine an amount of time associated with the first instruction;
determine the amount of time has elapsed;
determine the list of instructions comprises a second instruction, the second instruction following the first instruction in the list of instructions;

send, to the first device, second data representing the amount of time has elapsed; and send, to the first device, third data representing the second instruction.

\* \* \* \* \*